(12) United States Patent
Miyawaki et al.

(10) Patent No.: US 11,247,381 B2
(45) Date of Patent: Feb. 15, 2022

(54) COMPOSITE CONTAINER, INNER LABEL AND PLASTIC MEMBER

(71) Applicant: DAI NIPPON PRINTING CO., LTD., Tokyo-to (JP)

(72) Inventors: Takuma Miyawaki, Tokyo-to (JP); Yusuke Suga, Tokyo-to (JP); Mariko Ichinose, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 897 days.

(21) Appl. No.: 14/898,623

(22) PCT Filed: Jun. 27, 2014

(86) PCT No.: PCT/JP2014/067230
§ 371 (c)(1),
(2) Date: Dec. 15, 2015

(87) PCT Pub. No.: WO2014/208746
PCT Pub. Date: Dec. 31, 2014

(65) Prior Publication Data
US 2016/0136864 A1 May 19, 2016

(30) Foreign Application Priority Data

Jun. 28, 2013 (JP) .................................. 2013-137101
Jun. 28, 2013 (JP) .................................. 2013-137126
(Continued)

(51) Int. Cl.
*B29C 49/24* (2006.01)
*B65D 23/08* (2006.01)
(Continued)

(52) U.S. Cl.
CPC .......... *B29C 49/2408* (2013.01); *B29C 49/04* (2013.01); *B29C 49/24* (2013.01);
(Continued)

(58) Field of Classification Search
CPC ..... B29C 49/2408; B29C 49/24; B29C 49/04; B65D 1/0207; B65D 23/0864; B32B 27/08; B29B 2911/14573
(Continued)

(56) References Cited

U.S. PATENT DOCUMENTS 3,401,475 A * 9/1968 Morehouse ............ B65D 25/34
40/306
3,760,968 A * 9/1973 Amberg ................. B65C 3/065
215/12.2
(Continued)

FOREIGN PATENT DOCUMENTS

CN 1635947 A 7/2005
CN 101203369 A 6/2008
(Continued)

OTHER PUBLICATIONS

Sep. 30, 2014 Search Report issued in International Patent Application No. PCT/JP2014/067230.
(Continued)

*Primary Examiner* — Ernesto A Grano
(74) *Attorney, Agent, or Firm* — Oliff PLC

(57) ABSTRACT

A composite preform including a preform and a plastic member in close contact with the outer surface of the preform is made by preparing the preform made of plastic material and arranging the plastic member to surround the outer surface of the preform. Subsequently, the composite preform is heated and inserted in a blow molding die and undergoes blow molding in the blow molding die, by which the preform and the plastic member of the composite pre-
(Continued)

form are inflated integrally and a composite container is obtained.

8 Claims, 20 Drawing Sheets

(30) Foreign Application Priority Data

| Jun. 28, 2013 | (JP) | ................................. | 2013-137139 |
|---|---|---|---|
| Jun. 28, 2013 | (JP) | .............................. | JP2013-137119 |
| Jan. 7, 2014 | (JP) | ................................. | 2014-001054 |
| Jan. 7, 2014 | (JP) | ................................. | 2014-001059 |

(51) Int. Cl.

| B29C 49/04 | (2006.01) |
|---|---|
| B29C 49/64 | (2006.01) |
| B32B 1/02 | (2006.01) |
| B32B 27/08 | (2006.01) |
| B65D 1/02 | (2006.01) |
| B29C 49/06 | (2006.01) |
| B29C 49/02 | (2006.01) |
| B29K 623/00 | (2006.01) |
| B29C 49/20 | (2006.01) |
| B29K 631/00 | (2006.01) |
| B29C 49/22 | (2006.01) |
| B29K 627/06 | (2006.01) |
| B29C 49/48 | (2006.01) |
| B29K 621/00 | (2006.01) |
| B29K 105/04 | (2006.01) |
| B29K 67/00 | (2006.01) |
| B29K 69/00 | (2006.01) |
| B29K 23/00 | (2006.01) |
| B29K 633/04 | (2006.01) |
| B29K 669/00 | (2006.01) |
| B29K 667/00 | (2006.01) |
| B29K 655/02 | (2006.01) |
| B29K 105/00 | (2006.01) |
| B29L 9/00 | (2006.01) |
| B29L 31/00 | (2006.01) |

(52) U.S. Cl.
CPC ............ *B29C 49/6409* (2013.01); *B32B 1/02* (2013.01); *B32B 27/08* (2013.01); *B65D 1/023* (2013.01); *B65D 1/0207* (2013.01); *B65D 23/0864* (2013.01); *B29B 2911/1408* (2013.01); *B29B 2911/1424* (2013.01); *B29B 2911/14093* (2013.01); *B29B 2911/14133* (2013.01); *B29B 2911/14331* (2015.05); *B29B 2911/14573* (2013.01); *B29C 49/06* (2013.01); *B29C 49/22* (2013.01); *B29C 49/221* (2013.01); *B29C 2049/021* (2013.01); *B29C 2049/2017* (2013.01); *B29C 2049/2047* (2013.01); *B29C 2049/241* (2013.01); *B29C 2049/2412* (2013.01); *B29C 2049/2431* (2013.01); *B29C 2049/4892* (2013.01); *B29K 2023/06* (2013.01); *B29K 2023/12* (2013.01); *B29K 2067/003* (2013.01); *B29K 2069/00* (2013.01); *B29K 2105/04* (2013.01); *B29K 2105/258* (2013.01); *B29K 2621/00* (2013.01); *B29K 2623/06* (2013.01); *B29K 2623/12* (2013.01); *B29K 2627/06* (2013.01); *B29K 2631/04* (2013.01); *B29K 2633/08* (2013.01); *B29K 2655/02* (2013.01); *B29K 2667/003* (2013.01); *B29K 2667/006* (2013.01); *B29K 2669/00* (2013.01); *B29K 2995/0015* (2013.01); *B29K 2995/0018* (2013.01); *B29K 2995/0049* (2013.01); *B29K 2995/0055* (2013.01); *B29K 2995/0067* (2013.01); *B29K 2995/0072* (2013.01); *B29L 2009/00* (2013.01); *B29L 2031/7158* (2013.01); *B32B 2307/7242* (2013.01); *B32B 2439/70* (2013.01)

(58) Field of Classification Search
USPC ......................................... 215/12.2
See application file for complete search history.

(56) References Cited

U.S. PATENT DOCUMENTS

| 4,573,596 | A | * | 3/1986 | Slat | ........................ | B29C 49/24 |
|---|---|---|---|---|---|---|
| | | | | | | 215/12.2 |
| 4,646,925 | A | * | 3/1987 | Nohara | ............... | B29C 45/1643 |
| | | | | | | 215/12.2 |
| 4,662,528 | A | | 5/1987 | Slat | | |
| 5,411,698 | A | * | 5/1995 | Mero | ...................... | B29C 49/18 |
| | | | | | | 264/521 |
| 5,443,767 | A | | 8/1995 | Cahill | | |
| 5,628,957 | A | * | 5/1997 | Collette | .............. | B29C 49/0005 |
| | | | | | | 264/512 |
| 5,647,930 | A | | 7/1997 | Bright | | |
| 5,851,471 | A | | 12/1998 | Schloss et al. | | |
| 5,968,620 | A | * | 10/1999 | Harvey | ................. | B01L 3/5082 |
| | | | | | | 156/272.6 |
| 6,001,208 | A | | 12/1999 | Kinoshita et al. | | |
| 6,123,211 | A | * | 9/2000 | Rashid | .................... | B29B 11/08 |
| | | | | | | 215/12.1 |
| 6,294,127 | B1 | | 9/2001 | Huse | | |
| 6,352,426 | B1 | * | 3/2002 | Hutchinson | .......... | B29C 45/045 |
| | | | | | | 425/548 |
| 6,372,318 | B1 | * | 4/2002 | Collette | .................. | B29C 49/12 |
| | | | | | | 215/375 |
| 6,391,408 | B1 | * | 5/2002 | Hutchinson | ......... | B29C 45/1625 |
| | | | | | | 428/35.7 |
| 6,461,697 | B1 | * | 10/2002 | Slat | ................... | B29C 45/14778 |
| | | | | | | 215/12.2 |
| 6,474,499 | B2 | * | 11/2002 | Donelson | ............. | B65D 23/001 |
| | | | | | | 220/592.21 |
| 6,517,664 | B1 | * | 2/2003 | Dronzek, Jr. | .......... | C09J 103/02 |
| | | | | | | 156/328 |
| 6,524,672 | B1 | * | 2/2003 | Slat | ..................... | B29C 49/0073 |
| | | | | | | 215/12.2 |
| 6,548,133 | B2 | * | 4/2003 | Schmidt | .............. | B29C 45/1646 |
| | | | | | | 215/12.2 |
| 6,676,883 | B2 | | 1/2004 | Hutchinson et al. | | |
| 6,808,820 | B2 | * | 10/2004 | Lee | ..................... | B29C 45/1684 |
| | | | | | | 428/35.7 |
| 6,984,354 | B2 | * | 1/2006 | Shelby | .................... | B29C 49/24 |
| | | | | | | 215/12.1 |
| 7,794,149 | B2 | | 9/2010 | Wilkes | | |
| 8,636,159 | B2 | * | 1/2014 | Toyoda | ..................... | B32B 1/02 |
| | | | | | | 206/524.6 |
| 9,211,993 | B2 | * | 12/2015 | Tom | ...................... | B67D 7/025 |
| 2002/0166833 | A1 | * | 11/2002 | David Shelby | ......... | B29C 49/24 |
| | | | | | | 215/12.1 |
| 2003/0031814 | A1 | * | 2/2003 | Hutchinson | ......... | B29C 45/1684 |
| | | | | | | 428/35.7 |
| 2004/0151937 | A1 | * | 8/2004 | Hutchinson | ......... | B29C 33/3828 |
| | | | | | | 428/542.8 |
| 2005/0194280 | A1 | * | 9/2005 | Smith | ..................... | G09F 23/00 |
| | | | | | | 206/459.5 |
| 2006/0073294 | A1 | * | 4/2006 | Hutchinson | ............. | B29C 44/04 |
| | | | | | | 428/35.7 |
| 2006/0210746 | A1 | * | 9/2006 | Shi | ........................ | B29B 11/08 |
| | | | | | | 428/35.7 |
| 2015/0108077 | A1 | | 4/2015 | Maas et al. | | |

FOREIGN PATENT DOCUMENTS

| CN | 102007050 A | 4/2011 |
|---|---|---|
| CN | 102056814 A | 5/2011 |

(56) References Cited

FOREIGN PATENT DOCUMENTS

| | | |
|---|---|---|
| EP | 2508319 A1 | 10/2012 |
| FR | 2 785 845 A1 | 5/2000 |
| GB | 1227083 A | 3/1971 |
| JP | S46-29980 B1 | 8/1971 |
| JP | S52-81377 A | 7/1977 |
| JP | S56-24132 A | 3/1981 |
| JP | S56-16051 B2 | 4/1981 |
| JP | S57-151314 A | 9/1982 |
| JP | S57-157727 A | 9/1982 |
| JP | S59-91038 A | 5/1984 |
| JP | S61-206623 A | 9/1986 |
| JP | S62-5779 A | 1/1987 |
| JP | S64-030729 A | 2/1989 |
| JP | H03-088728 U | 9/1991 |
| JP | H05-52251 A | 3/1993 |
| JP | H05-228988 A | 9/1993 |
| JP | H06-039906 A | 2/1994 |
| JP | H07-125056 A | 5/1995 |
| JP | H07-149332 A | 6/1995 |
| JP | 2001-001391 A | 1/2001 |
| JP | 2003-170941 A | 6/2003 |
| JP | 2004-532147 A | 10/2004 |
| JP | 2005-343098 A | 12/2005 |
| JP | 2006123528 A | 5/2006 |
| JP | 2006-281630 A | 10/2006 |
| JP | 2006-315203 A | 11/2006 |
| JP | 2006341857 A | 12/2006 |
| JP | 2008-532816 A | 8/2008 |
| JP | 2008264634 A | 11/2008 |
| JP | 2009-210781 A | 9/2009 |
| JP | 2009-241526 A | 10/2009 |
| JP | 2009-241979 A | 10/2009 |
| JP | 2011116444 A | 6/2011 |
| JP | 2012-076751 A | 4/2012 |
| JP | 2012-207054 A | 10/2012 |
| JP | 2013177155 A | 9/2013 |
| JP | 2015009493 A | 1/2015 |
| KR | 20060128062 A | 12/2006 |
| WO | 2006101631 A2 | 9/2006 |
| WO | 2009/126712 A1 | 10/2009 |

OTHER PUBLICATIONS

Dec. 29, 2015 International Preliminary Report on Patentability issued in International Patent Application No. PCT/JP2014/067230.
Dec. 16, 2016 Chinese Office Action issued in Chinese Patent Application No. 201480030780.2.
Feb. 2, 2017 Extended Search Report issued in European Patent Application No. 14818725.5.
Apr. 21, 2017 Office Action issued in Japanese Patent Application No. 2013-137101.
Apr. 21, 2017 Office Action issued in Japanese Patent Application No. 2013-137119.
Apr. 21, 2017 Office Action issued in Japanese Patent Application No. 2013-137126.
Apr. 21, 2017 Office Action issued in Japanese Patent Application No. 2013-137139.
Aug. 17, 2017 Office Action issued in Chinese Patent Application No. 201480030780.2.
Sep. 5, 2017 Informational Offer Form issued in Japanese Patent Application No. 2013-137126.
Sep. 5, 2017 Informational Offer Form issued in Japanese Patent Application No. 2013-137139.
Dec. 1, 2017 Office Action issued in Japanese Patent Application No. 2014-001059.
Dec. 1, 2017 Office Action issued in Japanese Patent Application No. 2014-001054.
Dec. 1, 2017 Office Action issued in Japanese Patent Application No. 2013-137101.
Dec. 1, 2017 Office Action issued in Japanese Patent Application No. 2013-137119.
Dec. 1, 2017 Office Action issued in Japanese Patent Application No. 2013-137126.
Dec. 1, 2017 Office Action issued in Japanese Patent Application No. 2013-137139.
Sep. 4, 2018 Decision of Dismissal of Amendment issued in Japanese Patent Application No. 2013-137101.
Sep. 4, 2018 Decision of Dismissal of Amendment issued in Japanese Patent Application No. 2013-137119.
Sep. 4, 2018 Decision of Dismissal of Amendment issued in Japanese Patent Application No. 2013-137126.
Sep. 4, 2018 Decision of Dismissal of Amendment issued in Japanese Patent Application No. 2013-137139.
Sep. 4, 2018 Decision of Rejection issued in Japanese Patent Application No. 2013-137101.
Sep. 4, 2018 Decision of Rejection issued in Japanese Patent Application No. 2013-137119.
Sep. 4, 2018 Decision of Rejection issued in Japanese Patent Application No. 2013-137126.
Sep. 4, 2018 Decision of Rejection issued in Japanese Patent Application No. 2013-137139.
Sep. 4, 2018 Office Action issued in Japanese Patent Application No. 2014-001059.
Sep. 4, 2018 Office Action issued in Japanese Patent Application No. 2014-001054.
Mar. 1, 2019 Office Action issued in Japanese Patent Application No. 2018-065646.
Mar. 1, 2019 Office Action issued in Japanese Patent Application No. 2018-065591.
Jul. 29, 2019 Office Action issued in Korean Patent Application No. 10-2015-7027639.
Oct. 29, 2019 Office Action issued in Japanese Patent Application No. 2014-001059.
Oct. 29, 2019 Office Action issued in Japanese Patent Application No. 2014-001054.
Sep. 27, 2019 Office Action issued in Japanese Patent Application No. 2018-065646.
Sep. 27, 2019 Office Action issued in Japanese Patent Application No. 2018-065591.
Apr. 10, 2020 Office Action issued in Japanese Patent Application No. 2018-065646.
Apr. 10, 2020 Office Action issued in Japanese Patent Application No. 2018-065591.
Feb. 26, 2020 Office Action issued in Korean Patent Application No. 10-2015-7027639.
May 20, 2020 Office Action issued Chinese Patent Application No. 201910553439.X.
Jun. 23, 2020 Trial and Appeal Decision issued in Japanese Patent Application No. 2013-137126.
Jun. 23, 2020 Trial and Appeal Decision issued in Japanese Patent Application No. 2013-137139.
Oct. 2, 2020 Office Action issued in Japanese Patent Application No. 2019-144694.
Mar. 16, 2021 Office Action issued in Japanese Patent Application No. 2020-114187.
Sep. 21, 2021 Office Action Issued in U.S. Appl. No. 17/088,255.
Oct. 1, 2021, Non-Final Office Action Issued in U.S. Appl. No. 17/088,208.
Jul. 26, 2021 Office Action issued in Japanese Patent Application No. 2020-114187.

* cited by examiner

COMPOSITE CONTAINER, INNER LABEL AND PLASTIC MEMBER

TECHNICAL FIELD

The present invention relates to a blow molding method, a composite preform, a composite container, an inner label member, and a plastic member.

BACKGROUND ART

Recently, bottles made of plastic are more and more commonly used as the bottles for storing drink, food, etc. in the form of liquid. Such a plastic bottle stores a specified type of liquid (filling liquid).

Such a plastic bottle for storing a filling liquid is manufactured by inserting a preform in a mold (die) and performing the biaxially oriented blow molding on the preform.

In conventional biaxially oriented blow molding methods, the formation (molding) into the shape of the container is conducted by using a preform containing a single-layer material, multilayer material or blended material of PET, PP, etc., for example. However, it is common in the conventional biaxially oriented blow molding methods to just form (mold) the preform into the container shape. Thus, even when various functions and characteristics (barrier property, warm keeping property, etc.) have to be given to the container, only limited means (e.g., changing a material constituting the preform) can be employed for achieving the object. It is especially difficult to give different functions and characteristics respectively to different parts (trunk part, bottom part, etc.) of the container.

PRIOR ART LITERATURE

Patent Literature

Patent Literature 1: JP-A-2009-241526

The object of the present invention, which has been made in consideration of the above-described situation, is to provide a blow molding method, a composite preform, a composite container, an inner label member and a plastic member with which various functions and characteristics can be given to the container.

DISCLOSURE OF THE INVENTION

According to an aspect of the present invention, there is provided a blow molding method for molding a composite container, including: preparing a preform which is made of plastic material; making a composite preform including the preform and a plastic member in close contact with, the outer surface of the preform by arranging the plastic member to surround the outer surface of the preform; heating the composite preform and inserting the composite preform in a blow molding die; and integrally inflating the preform and the plastic member of the composite preform by performing blow molding on the composite preform in the blow molding die.

Preferably, in the above blow molding method, the preform includes a mouth part, a trunk part and a bottom part. The plastic member is arranged to cover the trunk part and the bottom part of the preform.

Preferably, in the above blow molding method, the preform includes a mouth part, a trunk part and a bottom part. The plastic member is arranged to cover a part of the trunk part and bottom part of the preform.

Preferably, in the above blow molding method, the plastic member has a gas barrier property or a ray barrier property.

Preferably, in the above blow molding method, the plastic member has been provided with a design or printing.

Preferably, in the above blow molding method, the plastic member is made of material having a higher warm keeping property or cool keeping property than the plastic material forming the preform.

Preferably, in the above blow molding method, the plastic member is made of material that is less slippery than the plastic material forming the preform.

Preferably, in the above blow molding method, the plastic member is an outer contractive member having a function of contracting with respect to the preform.

Preferably, in the above blow molding method, the outer contractive member contracts with respect to the preform when heat is add to the outer contractive member.

Preferably, in the above blow molding method, the plastic member is an outer contractive member having a function of contracting with respect to the preform. The making of the composite preform includes arranging the outer contractive member outside the preform and heating the preform and the outer contractive member.

According to another aspect of the present invention, there is provided a blow molding method for molding a composite container, including: preparing a preform which is made of plastic material; arranging an outer contractive member outside the preform; heating the preform and the outer contractive member and inserting the preform and the outer contractive member in a blow molding die; and integrally inflating the preform and the outer contractive member by performing blow molding on the preform and the outer contractive member in the blow molding die.

According to another aspect of the present invention, there is provided a composite preform including: a preform which is made of plastic material; and a plastic member which is arranged to surround the outer surface of the preform. The plastic member is set in close contact with the outer surface of the preform.

Preferably, in the above composite preform, the preform includes a mouth part, a trunk part and a bottom part. The plastic member is arranged to cover the trunk part and the bottom part of the preform.

Preferably, in the above composite preform, the preform includes a mouth part, a trunk part and a bottom part. The plastic member is arranged to cover a part of the trunk part and bottom part of the preform.

Preferably, in the above composite preform, the plastic member has a gas barrier property or a ray barrier property.

Preferably, in the above composite preform, the plastic member has been provided with a design or printing.

Preferably, in the above composite preform, the plastic member is made of material having a higher warm keeping property or cool keeping property than the plastic material forming the preform.

Preferably, in the above composite preform, the plastic member is made of material that is less slippery than the plastic material forming the preform.

Preferably, in the above composite preform, the plastic member is an outer contractive member having a function of contracting with respect to the preform.

Preferably, in the above composite preform, the outer contractive member contracts with respect to the preform when heat is add to the outer contractive member.

According to another aspect of the present invention, there is provided a composite container including: a container body which is made of plastic material; and a plastic member which is arranged in close contact with the outer surface of the container body. The container body and the plastic member have been integrally inflated by means of blow molding.

Preferably, in the above composite container, the container body includes a mouth part, a neck part, a shoulder part, a trunk part and a bottom part. The plastic member is arranged to cover the neck part, the shoulder part, the trunk part and the bottom part of the container body.

Preferably, in the above composite container, the container body includes a mouth part, a neck part, a shoulder part, a trunk part and a bottom part. The plastic member is arranged to cover a part of the neck part, shoulder part, trunk part and bottom part of the container body.

Preferably, in the above composite container, the plastic member has a gas barrier property or a ray barrier property.

Preferably, in the above composite container, the plastic member has been provided with a design or printing.

Preferably, in the above composite container, the plastic member is made of material having a higher warm keeping property or cool keeping property than the plastic material forming the container body.

Preferably, in the above composite container, the plastic member is made of material that is less slippery than the plastic material forming the container body.

Preferably, in the above composite container, the plastic member is an outer contractive member having a function of contracting.

Preferably, in the above composite container, the outer contractive member contracts when heat is add thereto.

According to another aspect of the present invention, there is provided a plastic member which is used for making a composite container including a preform and the plastic member in close contact with the outer surface of the preform by arranging the plastic member to surround the outer surface of the preform and heating the plastic member integrally with the preform. The plastic member includes a trunk part in a tubular shape which covers at least a trunk part of the preform.

According to another aspect of the present invention, there is provided a blow molding method for molding a composite container, including: preparing a preform which is made of plastic material; making a composite preform including the preform, an inner label member in close contact with the outer surface of the preform, and a plastic member in close contact with the outer surface of the inner label member by arranging the inner label member to surround the outer surface of the preform and arranging the plastic member outside the inner label member; heating the composite preform and inserting the composite preform in a blow molding die; and integrally inflating the preform, the inner label member and the plastic member of the composite preform by performing blow molding on the composite preform in the blow molding die.

Preferably, in the above blow molding method, the preform includes a mouth part, a trunk part and a bottom part. The inner label member and the plastic member are arranged to cover the trunk part and the bottom part of the preform.

Preferably, in the above blow molding method, the preform includes a mouth part, a trunk part and a bottom part. The inner label member and the plastic member are arranged to cover a part of the trunk part and bottom part of the preform.

Preferably, in the above blow molding method, at least one of the plastic member and the inner label member has a gas barrier property or a ray barrier property.

Preferably, in the above blow molding method, at least one of the plastic member and the inner label member has been provided with a design or printing.

Preferably, in the above blow molding method, at least one of the plastic member and the inner, label member is made of material having a higher warm keeping property or cool keeping property than the plastic material forming the preform.

Preferably, in the above blow molding method, the plastic member is made of material that is less slippery than the plastic material forming the preform.

Preferably, in the above blow molding method, the plastic member is an outer contractive member having a function of contracting with respect to the preform.

Preferably, in the above blow molding method, the outer contractive member contracts with respect to the preform when heat is add to the outer contractive member.

Preferably, in the above blow molding method, the plastic member is an outer contractive member having a function of contracting with respect to the preform. The making of the composite preform includes: arranging the inner label member outside the preform and arranging the outer contractive member outside the inner label member; and heating the preform, the inner label member and the outer contractive member.

According to another aspect of the present invention, there is provided a blow molding method for molding a composite container, including: preparing a preform which is made of plastic material; arranging an inner label member outside the preform and arranging an outer contractive member outside the inner label member; heating the preform, the inner label member and the outer contractive member and inserting the preform, the inner label member and the outer contractive member in a blow molding die; and integrally inflating the preform, the inner label member and the outer contractive member by performing blow molding on the preform, the inner label member and the outer contractive member in the blow molding die.

According to another aspect of the present invention, there is provided a composite preform including: a preform which is made of plastic material; an inner label member which is arranged to surround and to be in close contact with the outer surface of the preform; and a plastic member which is arranged in close contact with the outer surface of the inner label member.

Preferably, in the above composite preform, the preform includes a mouth part, a trunk part and a bottom part. The inner label member and the plastic member are arranged to cover the trunk part and the bottom part of the preform.

Preferably, in the above composite preform, the preform includes a mouth part, a trunk part and a bottom part. The inner label member and the plastic member are arranged to cover a part of the trunk part and bottom part of the preform.

Preferably, in the above composite preform, at least one of the plastic member and the inner label member has a gas barrier property or a ray barrier property.

Preferably, in the above composite preform, at least one of the plastic member and the inner label member has been provided with a design or printing.

Preferably, in the above composite preform, at least one of the plastic member and the inner label member is made of material having a higher warm keeping property or cool keeping property than the plastic material forming the preform.

Preferably, in the above composite preform, the plastic member is made of material that is less slippery than the plastic material forming the preform.

Preferably, in the above composite preform, the plastic member is an outer contractive member having a function of contracting with respect to the preform.

Preferably, in the above composite preform, the outer contractive member contracts with respect to the preform when heat is add to the outer contractive member.

According to another aspect of the present invention, there is provided a composite container including: a container body which is made of plastic material; an inner label member which is arranged to surround and to be in close contact with the outer surface of the container body; and a plastic member which is arranged in close contact with the outer surface of the inner label member. The container body, the inner label member and the plastic member have been integrally inflated by means of blow molding.

Preferably, in the above composite container, the container body includes a mouth part, a neck part, a shoulder part, a trunk part and a bottom part. The inner label member and the plastic member are arranged to cover the neck part, the shoulder part, the trunk part and the bottom part of the container body.

Preferably, in the above composite container, the container body includes a mouth part, a neck part, a shoulder part, a trunk part and a bottom part. The inner label member and the plastic member are arranged to cover a part of the neck part, shoulder part, trunk part and bottom part of the container body.

Preferably, in the above composite container, at least one of the plastic member and the inner label member has a gas barrier property or a ray barrier property.

Preferably, in the above composite container, at least one of the plastic member and the inner label member has been provided with a design or printing.

Preferably, in the above composite container, at least one of the plastic member and the inner label member is made of material having a higher warm keeping property or cool keeping property than the plastic material forming the container body.

Preferably, in the above composite container, the plastic member is made of material that is less slippery than the plastic material forming the container body.

Preferably, in the above composite container, the plastic member is an outer contractive member having a function of contracting.

Preferably, in the above composite container, the outer contractive member contracts when heat is add thereto.

According to another aspect of the present invention, there is provided an inner label member which is used for making a composite preform including a preform, the inner label member in close contact with the outer surface of the preform, and a plastic member in close contact with the outer surface of the inner label member by arranging the inner label member on the inside of the plastic member to surround the outer surface of the preform and heating the inner label member integrally with the preform and the plastic member. The inner label member includes a trunk part in a tubular shape which covers a trunk part of the preform.

According to another aspect of the present invention, there is provided a plastic member which is used for making a composite preform including a preform, an inner label member in close contact with the outer surface of the preform, and the plastic member in close contact with the outer surface of the inner label member by arranging the plastic member outside the inner label member to surround the outer surface of the preform and heating the plastic member integrally with the preform and the inner label member. The plastic member includes a trunk part in a tubular shape which covers a trunk part of the preform.

According to the present invention, the preform and the plastic member of the composite preform are integrally inflated by performing the blow molding on the composite preform in the blow molding die. Therefore, the preform (container body) and the plastic member can be formed of different members (materials), and various functions and characteristics can be given to the composite container by properly selecting the type and shape of the plastic member.

MODE FOR CARRYING OUT THE INVENTION

First Embodiment

A first embodiment of the present invention will be described below with reference to figures. FIGS. 1 to 10 are schematic diagram showing the first embodiment of the present invention.

First, the outline of a composite container manufactured by a blow molding method according to this embodiment will be described below with reference to FIGS. 1 and 2. Incidentally, expressions "below" and "above" in this description respectively mean below and above in the state in which the composite container 10A is stood normally (see FIG. 1).

Figure 1:
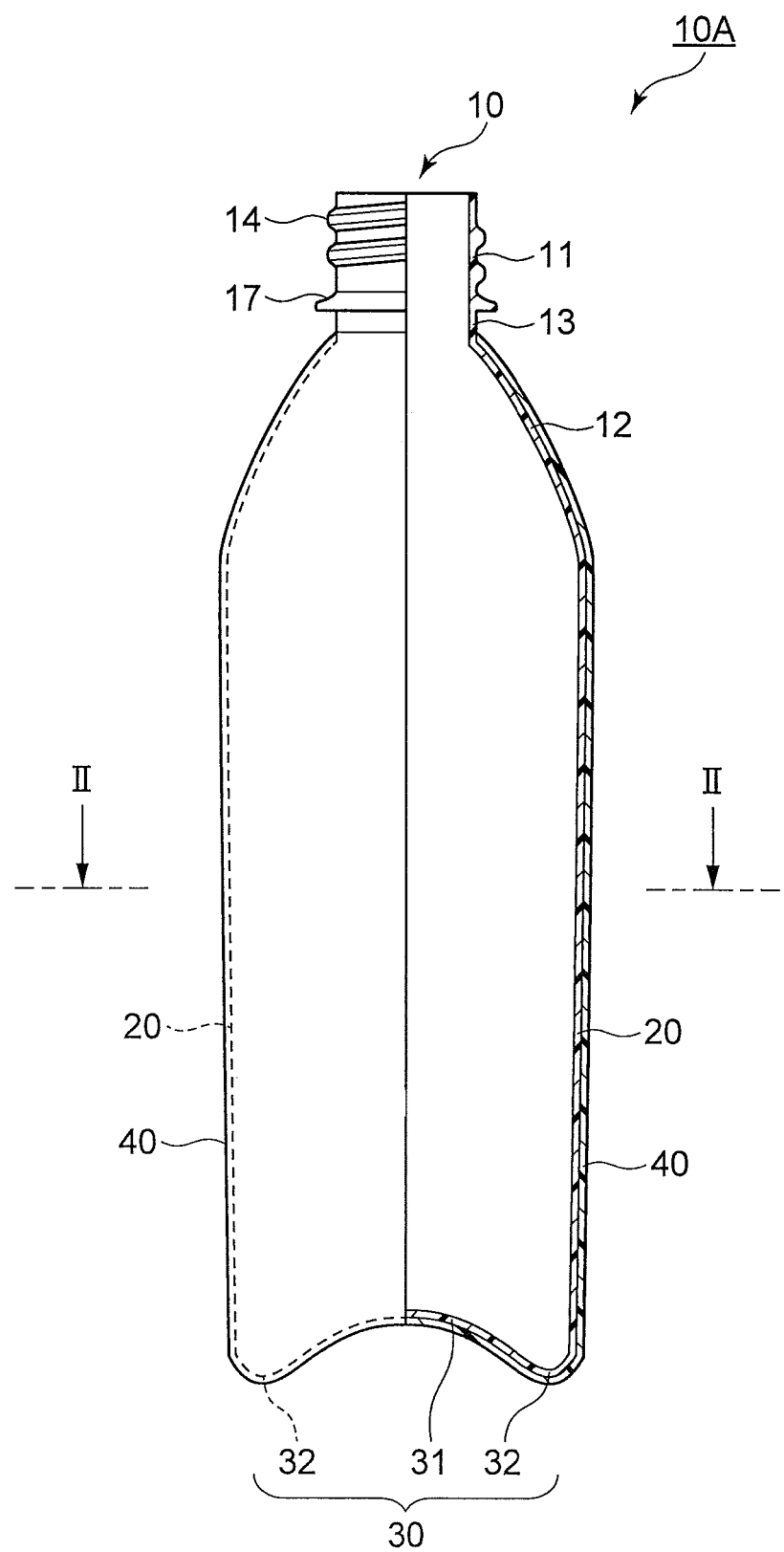
FIG. 1 is a partial vertical sectional view showing a composite container according to a first embodiment of the present invention.
Figure 2:
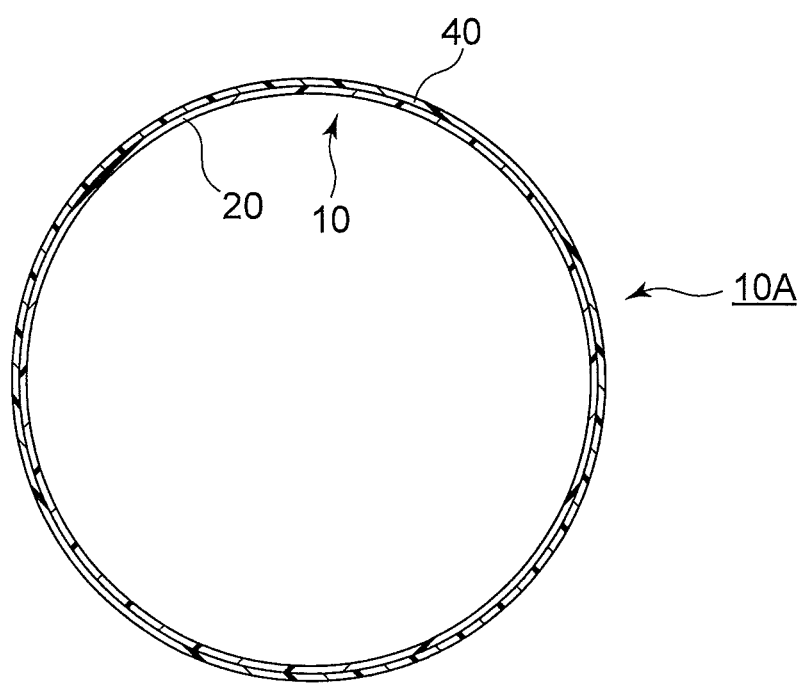
FIG. 2 is a horizontal sectional view showing the composite container according to the first embodiment of the present invention (cross-sectional view taken along the line II-II in FIG. 1).

The composite container 10A shown in FIGS. 1 and 2 is obtained by integrally inflating a preform 10a and a plastic member 40a of a composite preform 70 through biaxially oriented blow molding which is performed on the composite preform 70 including the preform 10a and the plastic member 40a (see FIG. 3) by use of a blow molding die 50 as will be explained later.

Such a composite container 10A includes an internally arranged container body 10 which is made of plastic material and a plastic member 40 which is arranged in close contact with the outer surface of the container body 10.

The container body 10 includes a mouth part 11, a neck part 13 formed below the mouth part 11, a shoulder part 12 formed below the neck part 13, a trunk part 20 formed below the shoulder part 12, and a bottom part 30 formed below the trunk part 20.

On the other hand, the plastic member 40 is thinly stretched and fixed on the outer surface of the container body 10 in close contact with the outer surface so that the plastic member 40 cannot easily move or rotate with respect to the container body 10.

Next, the container body 10 will be explained in detail. As explained above, the container body 10 includes the mouth part 11, the neck part 13, the shoulder part 12, the trunk part 20 and the bottom part 30.

The mouth part 11 includes a screw part 14 onto which a cap (unshown) will be screwed and a flange part 17 which is formed below the screw part 14. The mouth part 11 may be formed in a conventionally-known shape.

The neck part 13, situated between the flange part 17 and the shoulder part 12, has a substantially cylindrical shape that is virtually uniform in diameter. The shoulder part 12, situated between the neck part 13 and the trunk part 20, is in a shape whose diameter gradually increases from the side of the neck part 13 toward the side of the trunk part 20.

The trunk part 20 has a cylindrical shape that is substantially uniform in diameter as a whole. However, the shape of the trunk part 20 is not restricted to this example; the trunk part 20 may also be formed in a polygonal tube shape (quadrangle tube, octagonal tube, etc.), in a tubular shape whose horizontal cross sections are not uniform from top to bottom, and so forth. While the trunk part 20 in this embodiment has a substantially even surface with no concavity or convexity formed thereon, the trunk part 20 may be provided with a concavity or convexity (panel, groove, etc.), for example.

On the other hand, the bottom part 30 has a concave part 31 situated at the center and a grounding part 32 formed around the concave part 31. The shape of the bottom part 30 is also not particularly limited. The bottom part 30 may be formed in a conventionally-known shape (petaloid bottom shape, round bottom shape, etc.).

The thickness of the container body 10 in the trunk part 20 can be made as thin as approximately 50 μm to 250 μm, for example, although not limited to this example. The weight of the container body 10 can be set between 10 g and 20 g (also not limited to this example). Weight reduction of the container body 10 can be achieved by thinning down the wall thickness of the container body 10 as above.

Such a container body 10 can be made by performing the biaxially oriented blow molding on the preform 10a (explained later) made by injection molding of a synthetic resin material. Thermoplastic resin is desired to be used as the material of the preform 10a (i.e., the material of the container body 10). Especially, the use of PE (polyethylene), PP (polypropylene), PET (polyethylene terephthalate), PEN (polyethylene naphthalate) or PC (polycarbonate) is desirable. It is also possible to blend some of the aforementioned resins together for the use for the container body 10. Further, a vapor deposited film such as a diamond-like carbon film or a silicon oxide thin film may be formed on the inner surface of the container body 10 in order to enhance the barrier property of the container.

The container body 10 can also be made as a multilayer molded bottle made up of two or more layers. Specifically, the container body 10 may be made as a multilayer bottle having a gas barrier property and a light blocking property by, for example, first forming a preform 10a made up of three or more layers including an intermediate layer made of resin having the gas barrier property and the light blocking property (e.g., MXD6, MXD6+fatty acid salt, PGA (polyglycolic acid), EVOH (ethylene vinyl alcohol copolymer) or PEN (polyethylene naphthalate)) by means of extrusion molding or injection molding and then performing the blow molding on the preform 10a. The intermediate layer may also be made by use of the blended resin made by blending some of the aforementioned resins together.

The container body 10 may also be made by first forming an expanded preform (foamed preform) having a foam cell diameter of 0.5 to 100 μm by mixing an inert gas (nitrogen gas, argon gas, etc.) into melted thermoplastic resin and then performing the blow molding on the expanded preform. Since such a container body 10 contains foam cells, the light blocking property of the whole container body 10 can be enhanced.

Such a container body 10 may be made up of a bottle having a full capacity of 150 ml to 1500 ml, for example.

Next, the plastic member 40 will be explained below. As will be explained later, the plastic member 40 (40a) is formed by being arranged to surround the outer surface of the preform 10a, being set in close contact with the outer surface of the preform 10a, and thereafter undergoing the biaxially oriented blow molding together with the preform 10a.

The plastic member 40 is attached to the outer surface of the container body 10 without using an adhesive, in such close contact that the plastic member 40 does not move or rotate with respect to the container body 10. The plastic member 40 covers the container body 10 while being thinly stretched on the outer surface of the container body 10. As shown in FIG. 2, the plastic member 40 is arranged in the entire range in regard to the circumferential direction of the container body 10 to surround the container body 10 and to have a substantially circular horizontal section.

In this example, the plastic member 40 is formed to cover parts of the container body 10 other than the mouth part 11 and the neck part 13, that is, to cover the shoulder part 12, the trunk part 20 and the bottom part 30. With such a plastic member 40, intended function and characteristic can be given to the shoulder part 12, the trunk part 20 and the bottom part 30 of the container body 10.

Incidentally, the plastic member 40 may also be formed on part or all of the surface of the container body 10 other than the mouth part 11. For example, the plastic member 40 may be formed to cover the container body 10 excluding the mouth part 11 (i.e., to totally cover the neck part 13, the shoulder part 12, the trunk part 20 and the bottom part 30). The plastic member 40 may either be formed as one member or two or more members. For example, the container body 10 may be provided with two plastic members 40: one on the outer surface of the shoulder part 12 and the other on the outer surface of the bottom part 30.

Such a plastic member 40a may either be a member not having or having a function of contracting with respect to the preform 10a.

In cases where the plastic member 40a has the function of contracting with respect to the preform 10a, the plastic member (outer contractive member) 40a is formed by being arranged outside the preform 10a and undergoing the heating and the biaxially oriented blow molding integrally with the preform 10a. Materials having the function of contracting with respect to the preform 10a can be used for such a plastic member (outer contractive member) 40a. The plastic member (outer contractive member) 40a may either be a member having its own contractility or elasticity and being capable of contracting without needing an external effect exerted thereon or a member that contracts (e.g., heat shrinkage) with respect to the preform 10a when an external effect (e.g., heat) is exerted thereon.

The thickness of the plastic member 40 after being attached to the container body 10 can be set at approximately 5 µm to 50 µm, for example, although not limited to this example.

Next, the configuration of the composite preform according to this embodiment will be described below with reference to FIG. 3.

Figure 3:
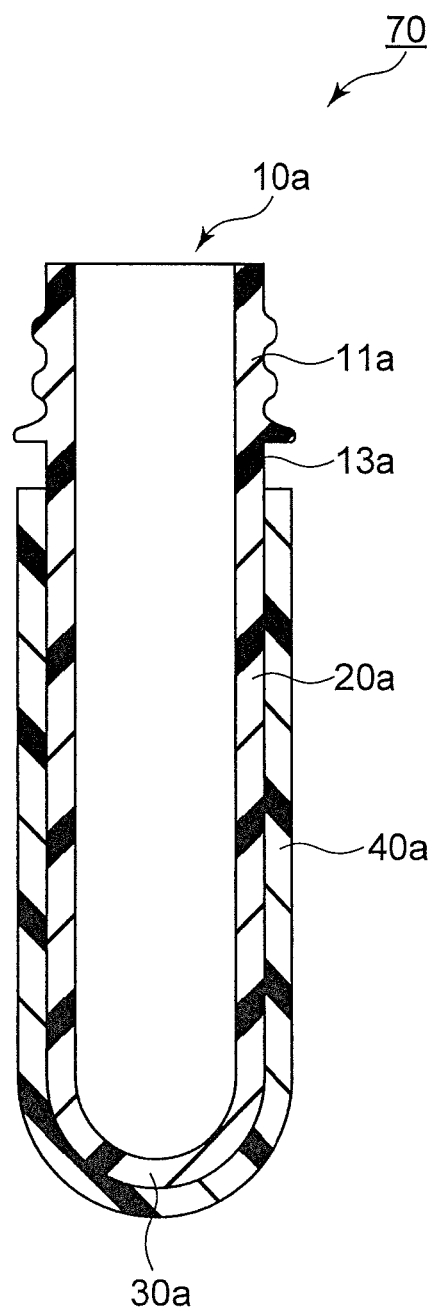
FIG. 3 is a vertical sectional view showing a composite preform according to the first embodiment of the present invention.
Figure 4:
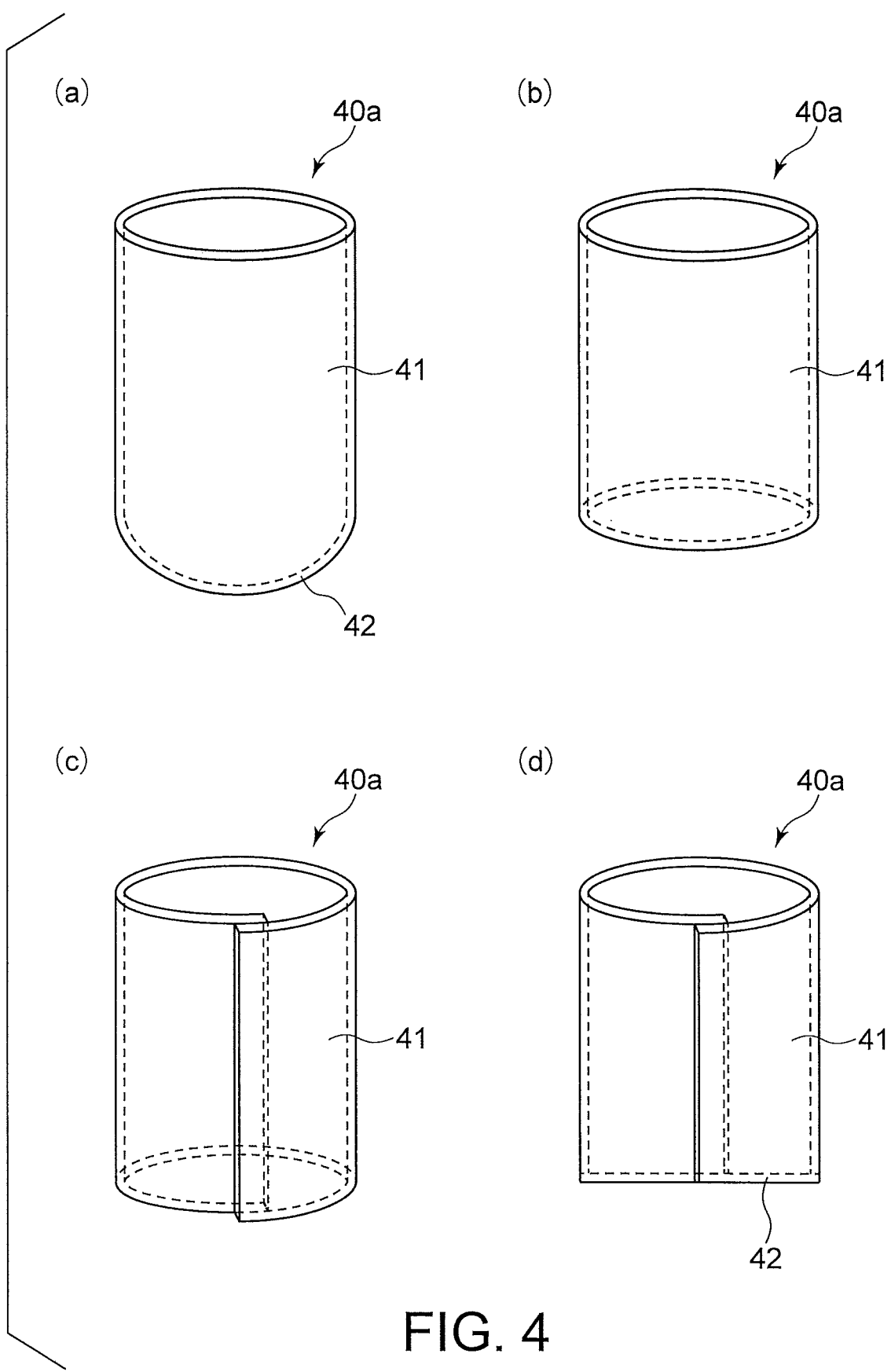
FIGS. 4(a) to 4(d) are perspective views showing various types of plastic members.
Figure 5:
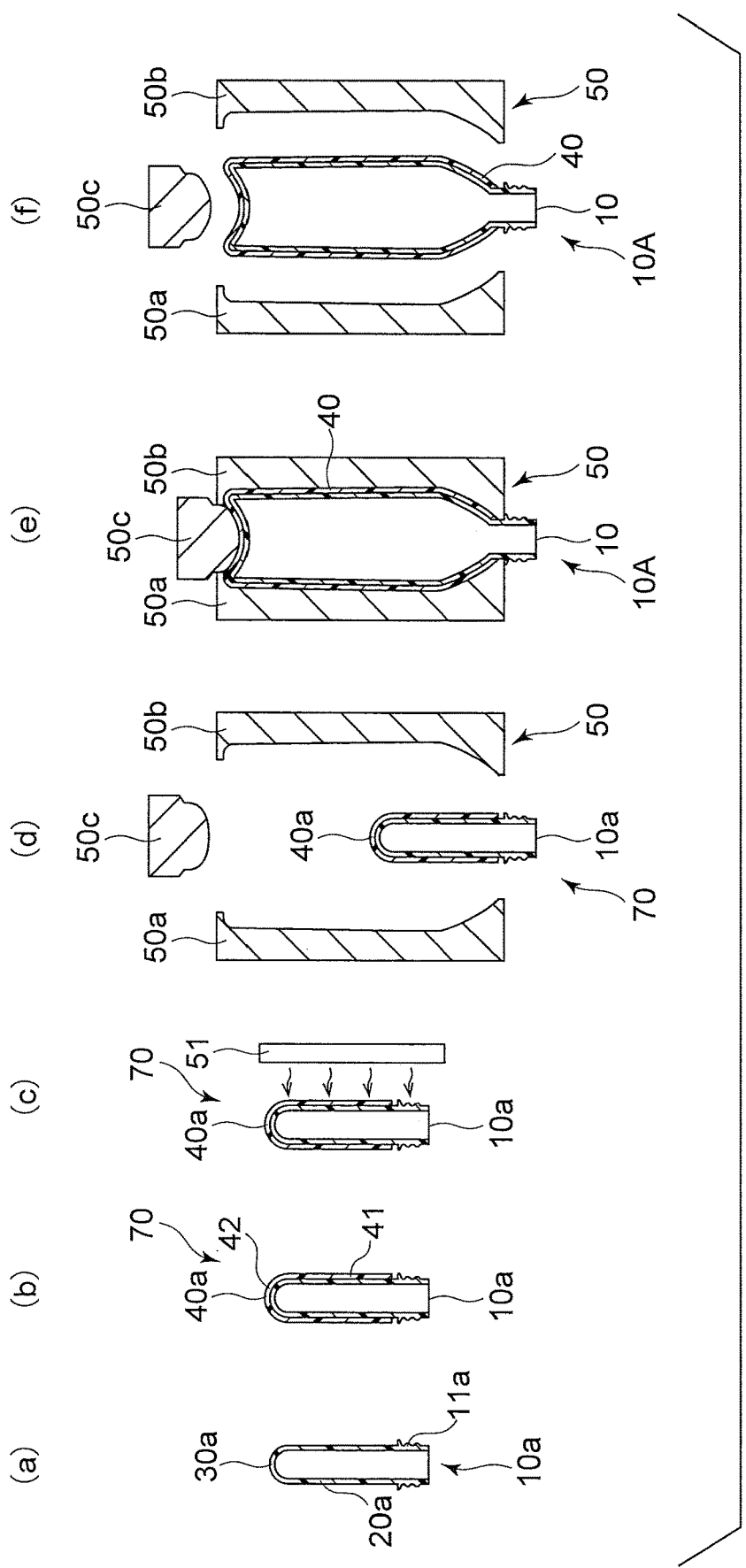
FIGS. 5(a) to 5(f) are schematic diagrams showing a blow molding method according to the first embodiment of the present invention.
Figure 6:
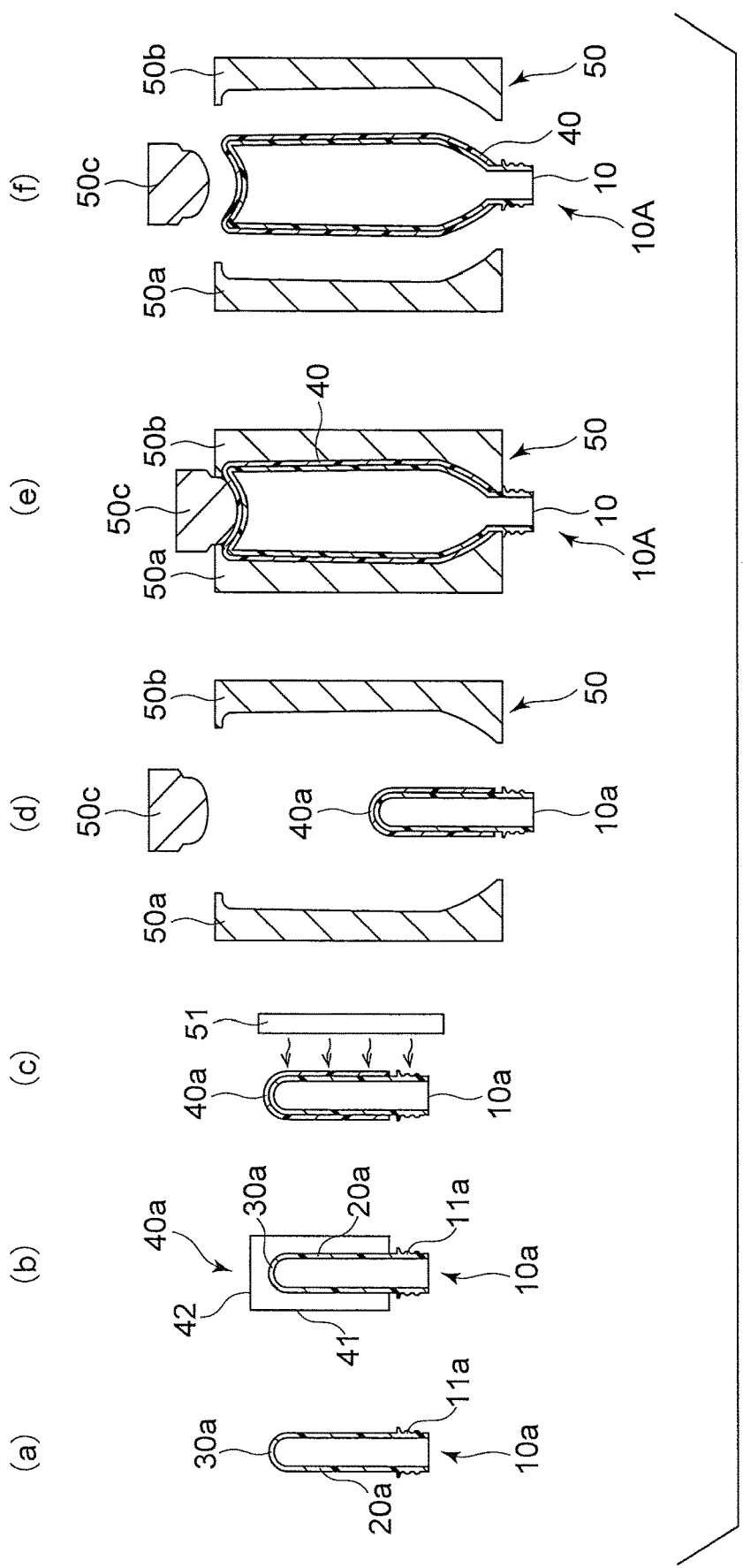
FIGS. 6(a) to 6(f) are schematic diagrams showing a blow molding method according to a modification of the first embodiment of the present invention.

As shown in FIG. 3, the composite preform 70 includes the preform 10a made of plastic material and the plastic member 40a in a bottomed cylindrical shape arranged outside the preform 10a.

The preform 10a includes a mouth part 11a, a trunk part 20a connected to the mouth part 11a, and a bottom part 30a connected to the trunk part 20a. The mouth part 11a, as a part corresponding to the aforementioned mouth part 11 of the container body 10, has substantially the same shape as the mouth part 11. The trunk part 20a, as a part corresponding to the aforementioned neck part 13, shoulder part 12 and trunk part 20 of the container body 10, has a substantially cylindrical shape. The bottom part 30a, as a part corresponding to the aforementioned bottom part 30 of the container body 10, has a substantially semispherical shape.

The plastic member 40a is attached to the outer surface of the preform 10a without using an adhesive, in such close contact that the plastic member 40a does not move or rotate with respect to the preform 10a. The plastic member 40a is arranged in the entire range in regard to the circumferential direction of the preform 10a to surround the preform 10a and to have a circular horizontal section.

In this case, the plastic member 40a is formed to cover the most of the trunk part 20a, excluding a part 13a corresponding to the neck part 13 of the container body 10, and to totally cover the bottom part 30a.

Incidentally, the plastic member 40a may also be formed on part or all of the surface of the preform 10a other than the mouth part 11a. For example, the plastic member 40a may be formed to cover the preform 10a excluding the mouth part 11a, that is, to totally cover the trunk part 20a and the bottom part 30a. The plastic member 40a may either be formed as one member or two or more members. For example, two plastic members 40a may be arranged respectively on different parts of the outer surface of the trunk part 20a.

Such a plastic member 40a may either be a member not having or having the function of contracting with respect to the preform 10a.

In the latter case, a member that contracts (e.g., heat shrinkage) with respect to the preform 10a when an external effect (e.g., heat) is exerted thereon may be used as the plastic member (outer contractive member) 40a.

Possible materials of the plastic member 40 include polyethylene, polypropylene, polyethylene terephthalate, polyethylene naphthalate, poly-4-methyl-pentene-1, polystyrene, acrylonitrile-styrene resin, acrylonitrile-butadiene-styrene resin, polyvinyl chloride, polyvinylidene chloride, polyvinyl acetate, polyvinyl alcohol, polyvinyl acetal, polyvinyl butyral, diallyl phthalate resin, fluorine-based resin, polymethyl methacrylate, polyacrylic acid, polymethyl acrylate, polyacrylonitrile, polyacrylamide, polybutadiene, polybutene-1, polyisoprene, polychloroprene, ethylene propylene rubber, isobutylene-isoprene rubber, nitrile rubber, acrylic rubber, silicone rubber, fluororubber, nylon 6, nylon 6.6, nylon MXD6, aromatic polyamide, polycarbonate, polyethylene terephthalate, polybutylene terephthalate, polyethylene naphthalate, U polymer, liquid crystal polymer, modified polyphenylene ether, polyether ketone, polyether ether ketone, unsaturated polyester, alkyd resin, polyimide, polysulfone, polyphenylene sulphide, polyethersulfone, silicone resin, polyurethane, phenolic resin, urea resin, polyethylene oxide, polypropylene oxide, polyacetal, and epoxy resin, for example. Among the above materials, the use of thermoplastic inelastic resin such as polyethylene (PE), polypropylene (PP), polyethylene terephthalate (PET) or polyethylene naphthalate (PEN) is desirable. Blended material, multilayer structure and partial multilayer structure of some of the above materials are also possible. Further, the light blocking property can be enhanced by using an expanded member (foamed member) having a foam cell diameter of 0.5 to 100 µm (obtained by mixing an inert gas (nitrogen gas, argon gas, etc.) into melted thermoplastic resin) and performing the molding on the expanded preform.

The plastic member 40a may also be made of the same material as the container body 10 (preform 10a). In this case, it is possible to arrange the plastic member 40 preferentially on a part of the composite container 10A needing reinforcement and thereby selectively increase the strength of the part. For example, the plastic member 40 may be arranged on parts of the container body 10 around the shoulder part 12 and the bottom part 30 so as to increase the strength of the parts. Such a plastic member 40 (40a) may be made of thermoplastic resin such as PE (polyethylene), PP (polypropylene), PET (polyethylene terephthalate), PEN (polyethylene naphthalate) or PC (polycarbonate).

The plastic member 40a may also be made of material having the gas barrier property (oxygen barrier property, water vapor barrier property, etc.). In this case, the gas barrier property of the composite container 10A can be enhanced and the deterioration of the liquid in the bottle by oxygen and water vapor can be prevented without the need of using a multilayer preform, a preform including blended material, or the like as the preform 10a. For example, it is possible to arrange the plastic member 40 (made of such material) to totally cover the shoulder part 12, the neck part 13, the trunk part 20 and the bottom part 30 of the container body 10 and thereby enhance the gas barrier property of these parts. Such material can be PE (polyethylene), PP (polypropylene), MXD-6 (nylon) or EVOH (ethylene vinyl alcohol copolymer), for example. It is also possible to mix an oxygen absorbent (e.g., fatty acid salt) with one or more of these materials.

The plastic member 40a may also be made of material having a ray barrier property against ultraviolet rays, etc. In this case, the ray barrier property of the composite container 10A can be enhanced and the deterioration of the liquid in the bottle by ultraviolet rays, etc. can be prevented without the need of using a multilayer preform, a preform including blended material, or the like as the preform 10a. For example, it is possible to arrange such a plastic member 40a to totally cover the shoulder part 12, the neck part 13, the trunk part 20 and the bottom part 30 of the container body 10 and thereby enhance the ultraviolet ray barrier property of these parts. Such material can be blended material or material made by adding light blocking resin to PET, PE or PP. It is also possible to use an expanded member (foamed member) having a foam cell diameter of 0.5 to 100 µm made by mixing an inert gas (nitrogen gas, argon gas, etc.) into melted thermoplastic resin.

The plastic member 40a may also be made of material having a higher warm keeping property or cool keeping property (i.e., lower thermal conductivity) than the plastic material forming the container body 10 (preform 10a). In this case, the conduction of the temperature of the liquid in the composite container 10A to the surface of the composite container 10A can be reduced without the need of increasing the thickness of the container body 10 itself. Consequently, the warm keeping property or cool keeping property of the composite container 10A is enhanced. For example, it is possible to arrange the plastic member 40 (made of such material) on part or all of the trunk part 20 of the container body 10 and thereby enhance the warm keeping property or cool keeping property of the trunk part 20. Further, the composite container 10A is prevented from becoming too hot or cold for the user to hold. Such material can be foamed polyurethane, polystyrene, PE (polyethylene), PP (polypropylene), phenolic resin, polyvinyl chloride, urea resin, silicone, polyimide, melamine resin, etc. It is also possible to use an expanded member (foamed member) having a foam cell diameter of 0.5 to 100 µm made by mixing an inert gas (nitrogen gas, argon gas, etc.) into melted thermoplastic resin.

The plastic member 40a may also be made of material that is less slippery than the plastic material forming the container body 10 (preform 10a). In this case, the composite container 10A can be made easy to hold for the user without the need of changing the material of the container body 10. For example, it is possible to arrange the plastic member 40 (made of such material) on part or all of the trunk part 20 of the container body 10 and thereby make the trunk part 20 easy to hold.

The plastic member 40a may also be provided with a design or printing. In this case, it becomes possible to display images and/or letters on the composite container 10A without the need of specially attaching a label or the like to the container body 10 after the blow molding. For example, it is possible to arrange the plastic member 40 (provided with a design or printing) on part or all of the trunk part 20 of the container body 10 and thereby display images and/or letters on the trunk part 20. In this case, the material of the plastic member 40 may either be the same as that of the container body 10 or different from that of the container body 10.

Next, the shape of the plastic member 40a will be explained below.

As shown in FIG. 3 and FIG. 4(a), the plastic member 40a may be formed in a bottomed cylindrical shape as a whole to have a trunk part 41 in a cylindrical shape and a bottom part 42 connected to the trunk part 41. In this case, the bottom part 42 of the plastic member 40a covers the bottom part 30a of the preform 10a, and thus various functions and characteristics can be given not only to the trunk part 20 but also to the bottom part 30 of the composite container 10A.

Figure 9:
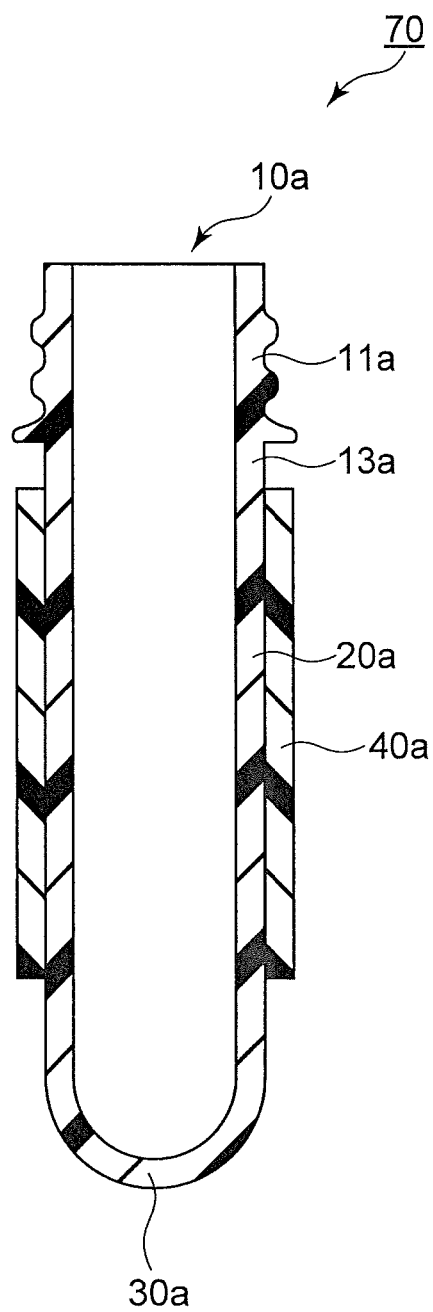
FIG. 9 is a vertical sectional view showing a modification of the composite preform according to the first embodiment of the present invention.

As shown in FIG. 9 (explained later) and FIG. 4(b), the plastic member 40a may also be formed in a circular tube shape (bottomless cylindrical shape) as a whole to have a trunk part 41 in a cylindrical shape. In this case, an extruded tube can be used as the plastic member 40a, for example.

As shown in FIG. 4(c) and FIG. 4(d), the plastic member 40a may also be made by forming a film into a tubular shape and bonding the film's edges together. In this case, the plastic member 40a may either be formed in a tubular shape (bottomless cylindrical shape) to have a trunk part 41 as shown in FIG. 4(c) or formed in a bottomed tubular shape as shown in FIG. 4(d) by forming the bottom part 42 through bonding.

Next, the blow molding method (manufacturing method of the composite container 10A) according to this embodiment will be explained below with reference to FIGS. 5(a) to 5(f).

First, the preform 10a made of plastic material is prepared (see FIG. 5(a)). In this step, the preform 10a may be made by injection molding by using an unshown injection molding machine, for example.

Subsequently, the composite preform 70, including the preform 10a and the plastic member 40a in close contact with the outer surface of the preform 10a, is made (see FIG. 5(b)) by arranging the plastic member 40a outside the preform 10a. In this example, the plastic member 40a is in a bottomed cylindrical shape as a whole and includes a trunk part 41 in a cylindrical shape and a bottom part 42 connected to the trunk part 41. This plastic member 40a is attached to the preform 10a so as to cover the most of the trunk part 20a, excluding the part corresponding to the neck part 13 of the container body 10, and to totally cover the bottom part 30a.

In this case, the plastic member 40a may be set in close contact with the outer surface of the preform 10a by preparing the plastic member 40a as a member having an inner diameter equal to or slightly smaller than the outer diameter of the preform 10a and pressing and sliding the plastic member 40a onto the preform 10a. Alternatively, as will be explained later, the plastic member 40a may be set in close contact with the outer surface of the preform 10a also by preparing the plastic member 40a as a member having heat shrinkability, arranging the plastic member 40a on the outer surface of the preform 10a, and heating the plastic member 40a at 50° C. to 100° C. to cause the heat shrinkage.

With this method previously making the composite preform 70 by setting the plastic member 40a in close contact with the outer surface of the preform 10a as above, it becomes possible to carry out the sequence of steps for making the composite preform 70 (FIGS. 5(a) to 5(b)) and the sequence of steps for making the composite container 10A by means of blow molding (FIGS. 5(c) to 5(f)) in different places (e.g., different factories).

Subsequently, the composite preform 70 is heated by a heating device 51 (see FIG. 5(c)). In this step, the composite preform 70, being rotated with its mouth part 11a facing downward, is heated by the heating device 51 evenly in regard to the circumferential direction. The heating temperature of the preform 10a and the plastic member 40a in this heating process may be set at 90° C. to 130° C., for example.

Subsequently, the composite preform 70 heated by the heating device 51 is fed to a blow molding die 50 (see FIG. 5(d)).

The composite container 10A is formed (molded) by using the blow molding die 50. In this example, the blow molding die 50 is made up of a pair of trunk part dies 50a and 50b and a bottom part die 50c which are separate from one another (see FIG. 5(d)). In FIG. 5(d), the pair of trunk part dies 50a and 50b is placed apart from each other and the bottom part die 50c is placed upward. In this state, the composite preform 70 is inserted between the pair of trunk part dies 50a and 50b.

Subsequently, as shown in FIG. 5(e), the bottom part die 50c is lowered and then the pair of trunk part dies 50a and 50b is closed. At this point, a hermetically sealed blow molding die 50 is formed by the pair of trunk part dies 50a and 50b and the bottom part die 50c. Then, the biaxially oriented blow molding is performed on the composite preform 70 by pumping air into the preform 10a.

By the blow molding, the container body 10 is obtained from the preform 10a in the blow molding die 50. Meanwhile, the trunk part dies 50a and 50b are heated up to 30° C. to 80° C. and the bottom part die 50c is cooled down to 5° C. to 25° C. In this step, the preform 10a and the plastic member 40a of the composite preform 70 are integrally inflated in the blow molding die 50. By the inflation, the preform 10a and the plastic member 40a are integrally formed into a shape corresponding to the inner surface of the blow molding die 50.

By the above process, the composite container 10A, including the container body 10 and the plastic member 40 arranged on the outer surface of the container body 10, is obtained.

Then, as shown in FIG. 5(f), the pair of trunk part dies 50a and 50b and the bottom part die 50c are separated from one another and the composite container 10A is extracted from the blow molding die 50.

Modification of Blow Molding Method

Next, a modification of the blow molding method (manufacturing method of the composite container 10A) according to this embodiment will be described below with reference to FIGS. 6(a) to 6(f). In the modification shown in FIGS. 6(a) to 6(f), the plastic member (outer contractive member) 40a is a member having the function of contracting with respect to the preform 10a. The rest of the configuration is substantially equivalent to that in the example shown in FIGS. 5(a) to 5(f). Elements in FIGS. 6(a) to 6(f) identical with those in FIGS. 5(a) to 5(f) are assigned the same reference characters as in FIGS. 5(a) to 5(f) and detailed explanation thereof is omitted for brevity.

First, the preform 10a made of plastic material is prepared (see FIG. 6(a)).

Subsequently, the plastic member (outer contractive member) 40a is arranged outside the preform 10a (see FIG. 6(b)). In this example, the plastic member (outer contractive member) 40a is in a bottomed cylindrical shape as a whole and includes a trunk part 41 in a cylindrical shape and a bottom part 42 connected to the trunk part 41. This plastic member (outer contractive member) 40a is attached to the preform 10a so as to cover the most of the trunk part 20a, excluding the part corresponding to the neck part 13 of the container body 10, and to totally cover the bottom part 30a.

Subsequently, the preform 10a and the plastic member (outer contractive member) 40a are heated by the heating device 51 (see FIG. 6(c)). In this step, the preform 10a and the plastic member (outer contractive member) 40a, being rotated with the mouth part 11a facing downward, are heated by the heating device 51 evenly in regard to the circumferential direction. The heating temperature of the preform 10a and the plastic member (outer contractive member) 40a in this heating process may be set at 90° C. to 130° C., for example.

The plastic member (outer contractive member) 40a heated as above contracts (heat shrinkage) and is set in close contact with the outer surface of the preform 10a (see FIG. 6(c)). In cases where the plastic member (outer contractive member) 40a itself has contractility, the plastic member (outer contractive member) 40a may already be in close contact with the outer surface of the preform 10a at the stage when the plastic member (outer contractive member) 40a is arranged outside the preform 10a (see FIG. 6(b)).

Subsequently, the preform 10a and the plastic member (outer contractive member) 40a heated by the heating device 51 are fed to a blow molding die 50 (see FIG. 6(d)).

The preform 10a and the plastic member (outer contractive member) 40a are formed (molded) by using the blow molding die 50. Similarly to the above-described example of FIGS. 5(a) to 5(f), the composite container 10A, including the container body 10 and the plastic member (outer contractive member) 40 arranged on the outer surface of the container body 10, is obtained (see FIGS. 6(d) to 6(f)).

Next, another modification of the blow molding method (manufacturing method of the composite container 10A) according to this embodiment will be described below with reference to FIGS. 7(a) to 7(g). In the modification shown in FIGS. 7(a) to 7(g), the plastic member (outer contractive member) 40a is a member having the function of contracting with respect to the preform 10a, and the preform 10a and the plastic member (outer contractive member) 40a are heated in two steps. The rest of the configuration is substantially equivalent to that in the example shown in FIGS. 5(a) to 5(f). Elements in FIGS. 7(a) to 7(g) identical with those in FIGS. 5(a) to 5(f) are assigned the same reference characters as in FIGS. 5(a) to 5(f) and detailed explanation thereof is omitted for brevity.

First, the preform 10a made of plastic material is prepared (see FIG. 7(a)).

Subsequently, the plastic member (outer contractive member) 40a is arranged outside the preform 10a (see FIG. 7(b)). In this example, the plastic member (outer contractive member) 40a is in a bottomed cylindrical shape as a whole and includes a trunk part 41 in a cylindrical shape and a bottom part 42 connected to the trunk part 41. This plastic member (outer contractive member) 40a is attached to the preform 10a so as to cover the most of the trunk part 20a, excluding the part corresponding to the neck part 13 of the container body 10, and to totally cover the bottom part 30a.

Subsequently, the preform 10a and the plastic member (outer contractive member) 40a are heated by a first heating device 55 (see FIG. 7(*c*)). In this step, the heating temperature of the preform 10*a* and the plastic member (outer contractive member) 40*a* may be set at 50° C. to 100° C., for example.

Figure 7:
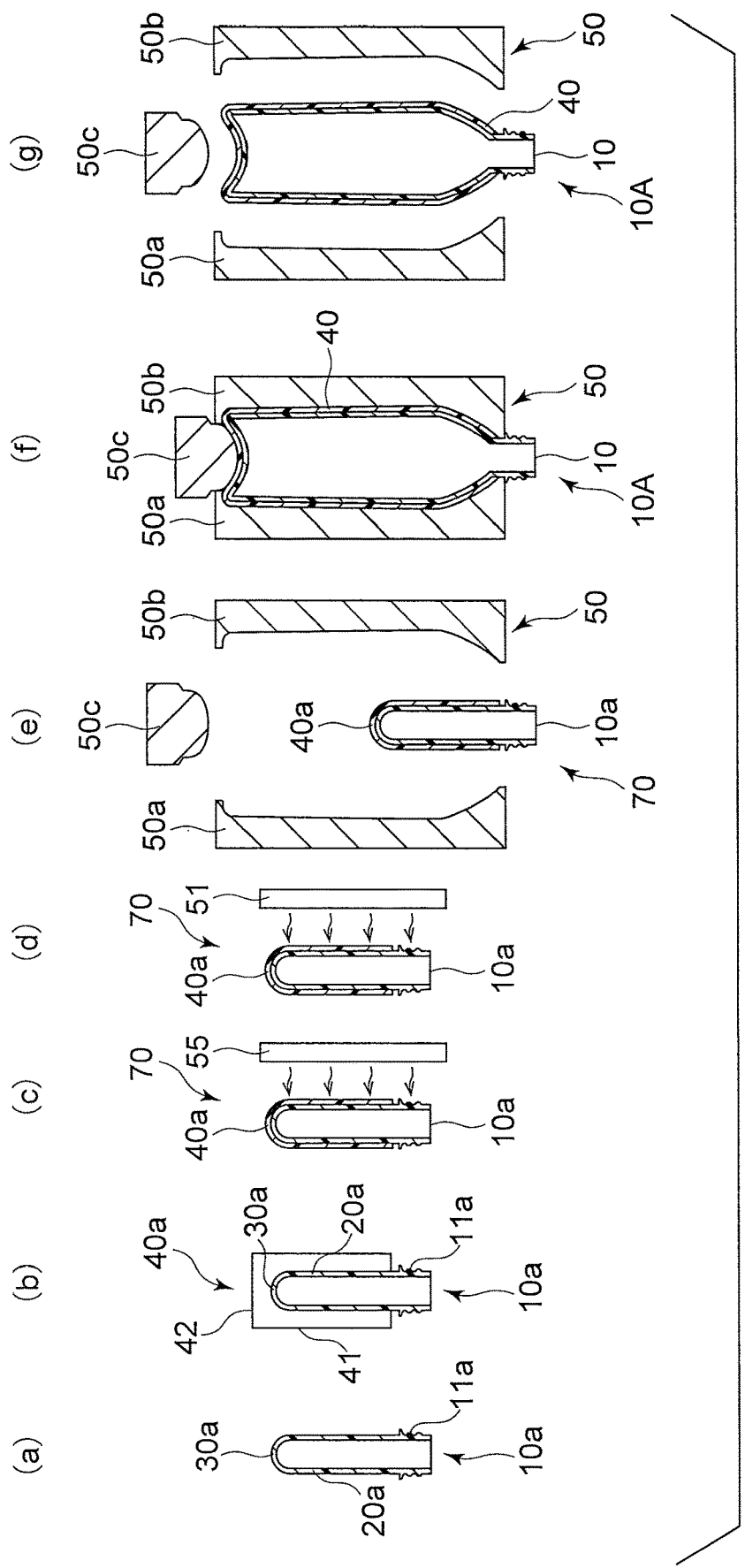
FIGS. 7(a) to 7(g) are schematic diagrams showing a blow molding method according to another modification of the first embodiment of the present invention.

The heated plastic member (outer contractive member) 40*a* contracts (heat shrinkage) and is set in close contact with the outer surface of the preform 10*a*, by which the composite preform 70 including the preform 10*a* and the plastic member (outer contractive member) 40*a* in close contact with the outer surface of the preform 10*a* is obtained (see FIG. 7(*c*)).

With this method previously making the composite preform 70 by heating the plastic member (outer contractive member) 40*a* by use of the first heating device 55 and setting the plastic member 40*a* in close contact with the outer surface of the preform 10*a* as above, it becomes possible to carry out the sequence of steps for making the composite preform 70 (FIGS. 7(*a*) to 7(*c*)) and the sequence of steps for making the composite container 10A by means of blow molding (FIGS. 7(*d*) to 7(*g*)) in different places (e.g., different factories).

Subsequently, the composite preform 70 is heated by a second heating device 51 (see FIG. 7(*d*)). In this step, the composite preform 70, being rotated with the mouth part 11*a* facing downward, is heated by the second heating device 51 evenly in regard to the circumferential direction. The heating temperature of the preform 10*a* and the plastic member (outer contractive member) 40*a* in this heating process may be set at 90° C. to 130° C., for example.

Subsequently, the composite preform 70 heated by the second heating device 51 is fed to a blow molding die 50 (see FIG. 7(*e*)).

The composite preform 70 is formed (molded) by using the blow molding die 50. Similarly to the above-described example of FIGS. 5(*a*) to 5(*f*), the composite container 10A, including the container body 10 and the plastic member (outer contractive member) 40 arranged on the outer surface of the container body 10, is obtained (see FIGS. 7(*e*) to 7(*g*)).

As described above, according to this embodiment, the composite container 10A including the container body 10 and the plastic member 40 is made by integrally inflating the preform 10*a* and the plastic member 40*a* of the composite preform 70 through the blow molding of the composite preform 70 in the blow molding die 50. Accordingly, the preform 10*a* (container body 10) and the plastic member 40*a* (plastic member 40) can be formed of different members (materials). Therefore, various functions and characteristics can be given to the composite container 10A in a flexible manner by properly selecting the type and shape of the plastic member 40.

Further, according to this embodiment, there arises no need for preparing new molding equipment for the manufacture of the composite containers 10A since a standard type of blow molding apparatus can directly be used for the manufacture of the composite containers 10A.

Modification

Next, a modification of the first embodiment of the present invention will be described below with reference to FIGS. 8, 9 and 10(*a*) to 10(*f*).

Figure 8:
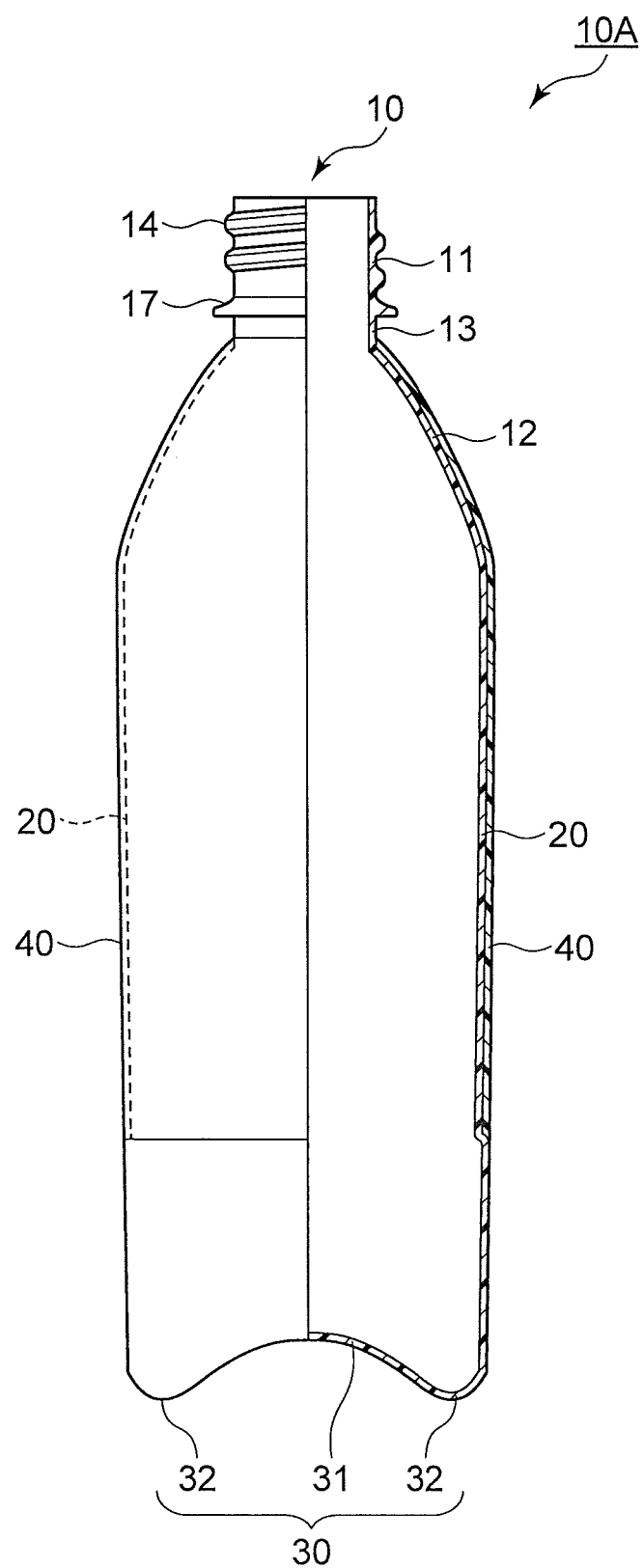
FIG. 8 is a partial vertical sectional view showing a modification of the composite container according to the first embodiment of the present invention.
Figure 10:
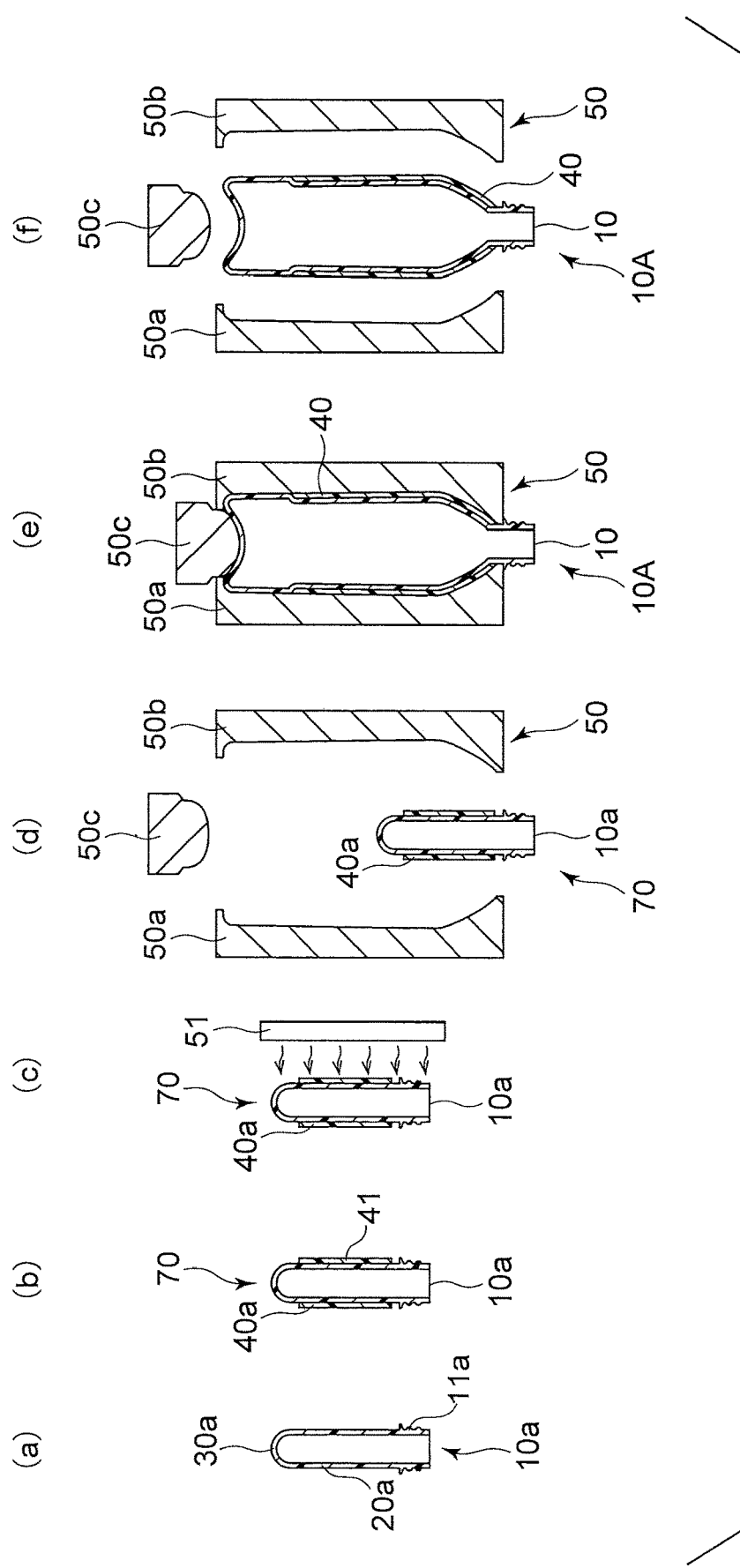
FIGS. 10(a) to 10(f) are schematic diagrams showing a modification of the blow molding method according to the first embodiment of the present invention.

In the modification shown in FIGS. 8, 9 and 10(*a*) to 10(*f*), a plastic member 40*a* in a cylindrical shape is used instead of the plastic member 40*a* having the trunk part and the bottom part.

In the composite container 10A shown in FIG. 8, the plastic member 40 extends from the shoulder part 12 of the container body 10 to a lower part of the trunk part 20 but does not reach the bottom part 30. Further, in the composite preform 70 shown in FIG. 9, the plastic member 40*a* is set in close contact with the preform 10*a* to cover only the trunk part 20*a* of the preform 10*a*. More specifically, the plastic member 40*a* covers the trunk part 20*a* excluding its lower part and the part 13*a* corresponding to the neck part 13 of the container body 10.

The rest of the configuration in FIGS. 8, 9 and 10(*a*) to 10(*f*) is substantially equivalent to that in the embodiment shown in FIGS. 1 to 5. In the modification shown in FIGS. 8, 9 and 10(*a*) to 10(*f*), elements identical with those in the embodiment shown in FIGS. 1 to 5 are assigned the same reference characters as in the embodiment and detailed explanation thereof is omitted for brevity.

Besides, the rest of the configuration and the manufacturing method of the composite container 10A and the rest of the configuration and the manufacturing method of the composite preform 70 are substantially equivalent to those in the embodiment shown in FIGS. 1 to 5, and thus detailed explanation thereof is omitted here. It is also possible in FIGS. 8, 9 and 10(*a*) to 10(*f*) to use a member having the function of contracting with respect to the preform 10*a* as the plastic member 40*a*.

Second Embodiment

Next, a second embodiment of the present invention will be described below with reference to figures. FIGS. 11 to 20 are schematic diagram showing the second embodiment of the present invention. Elements in FIGS. 11 to 20 identical with those in the first embodiment are assigned the same reference characters as in the first embodiment and detailed explanation thereof is omitted for brevity.

First, the outline of a composite container manufactured by a blow molding method according to this embodiment will be explained below with reference to FIGS. 11 and 12.

Figure 11:
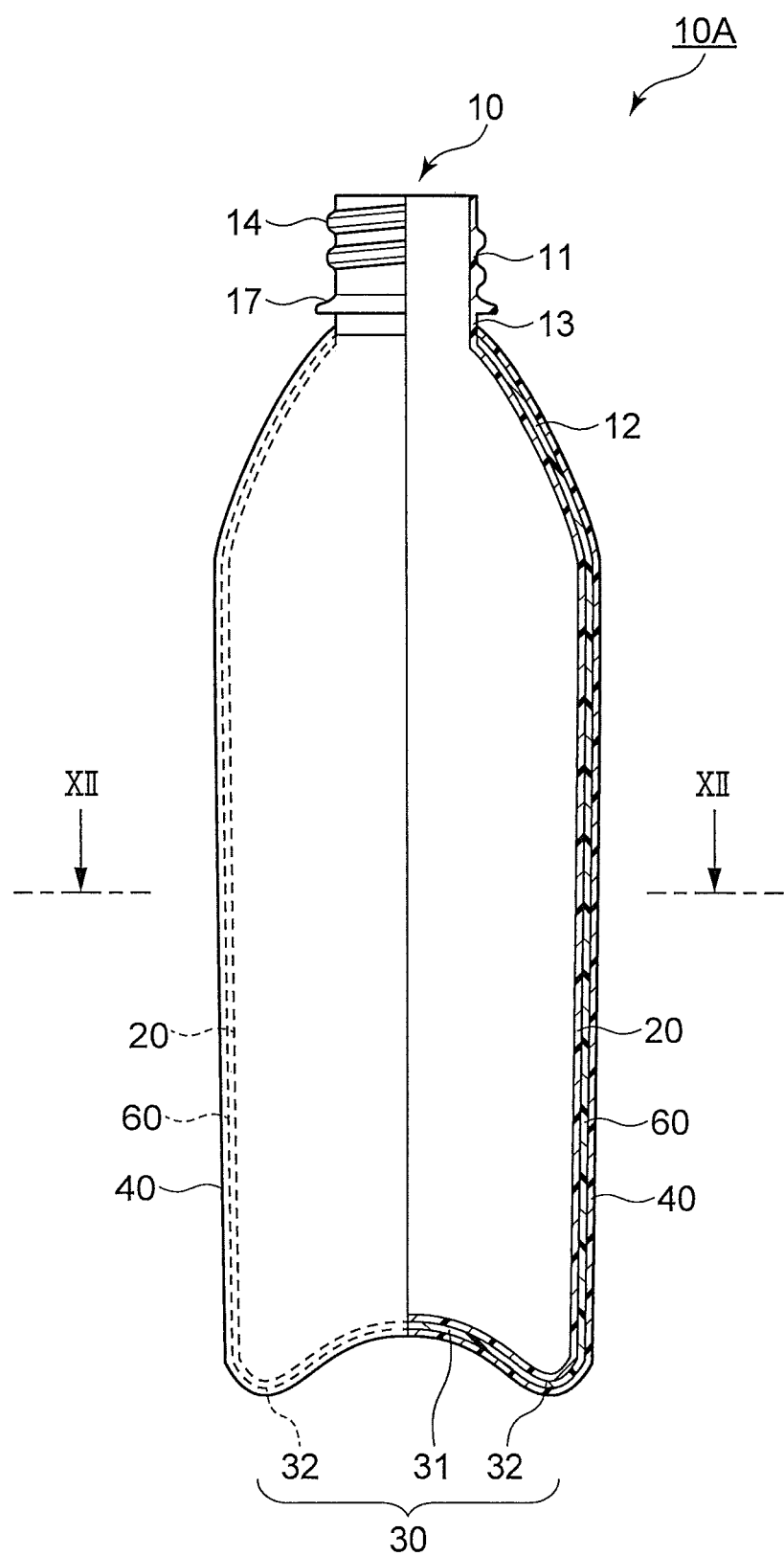
FIG. 11 is a partial vertical sectional view showing a composite container according to a second embodiment of the present invention.
Figure 12:
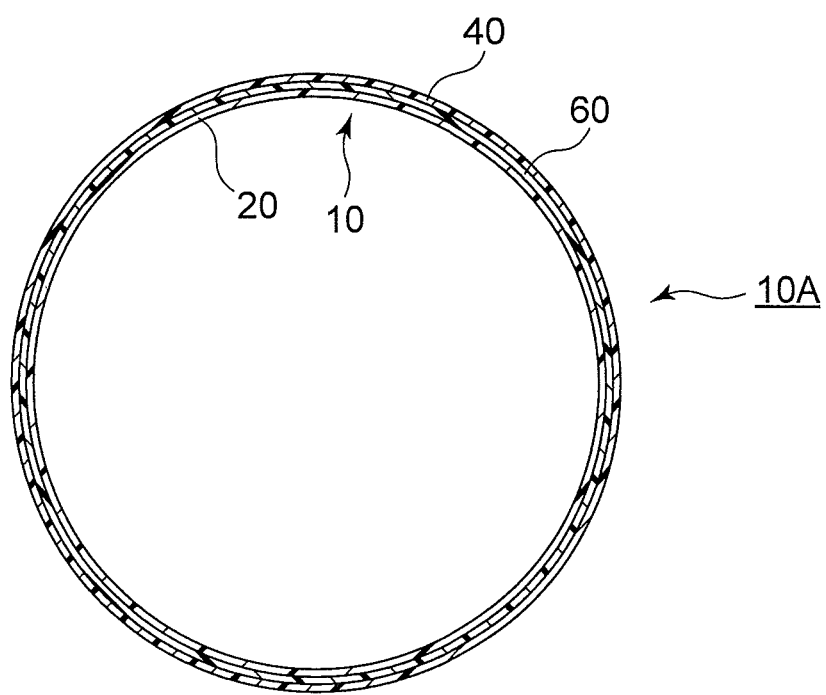
FIG. 12 is a horizontal sectional view showing the composite container according to the second embodiment of the present invention (cross-sectional view taken along the line XII-XII in FIG. 11).

The composite container 10A shown in FIGS. 11 and 12 is obtained by integrally inflating a preform 10*a*, an inner label member 60*a* and a plastic member 40*a* of a composite preform 70 through biaxially oriented blow molding which is performed on the composite preform 70 including the preform 10*a*, the inner label member 60*a* and the plastic member 40*a* (see FIG. 13) by use of a blow molding die 50 as will be explained later.

Such a composite container 10A includes an internally arranged container body 10 which is made of plastic material, an inner label member 60 which is arranged in close contact with the outer surface of the container body 10, and a plastic member 40 which is arranged in close contact with the outer surface of the inner label member 60.

The container body 10 includes a mouth part 11, a neck part 13 formed below the mouth part 11, a shoulder part 12 formed below the neck part 13, a trunk part 20 formed below the shoulder part 12, and a bottom part 30 formed below the trunk part 20.

The inner label member 60 is thinly stretched on the outer surface of the container body 10 in close contact with the outer surface so that the inner label member 60 cannot easily move or rotate with respect to the container body 10.

The plastic member 40 is thinly stretched on the outer surface of the inner label member 60 and the container body 10 in close contact with the outer surface so that the plastic member 40 cannot easily move or rotate with respect to the container body 10.

There can be cases where at least part of the plastic member 40 is transparent or semitransparent. In such cases, the inner label member 60 is visible from the outside through the transparent/semitransparent part. The plastic member 40 may either be formed so that the entire plastic member 40 is transparent/semitransparent or so as to have a nontransparent part and a transparent/semitransparent part (e.g., window part). In this embodiment, a case where the entire plastic member 40 is transparent will be explained as an example.

Next, the inner label member 60 will be explained below. As will be explained later, the inner label member 60 (60*a*) is formed by being arranged to surround the outer surface of the preform 10*a* and undergoing the biaxially oriented blow molding integrally with the preform 10*a* and the plastic member 40*a*.

The inner label member 60 is attached to the outer surface of the container body 10 without using an adhesive, in such close contact that the inner label member 60 does not move or rotate with respect to the container body 10. The inner label member 60 covers the container body 10 while being thinly stretched on the outer surface of the container body 10. As shown in FIG. 12, the inner label member 60 is arranged in the entire range in regard to the circumferential direction of the container body 10 to surround the container body 10 and to have a substantially circular horizontal section.

In this example, the inner label member 60 is formed to cover parts of the container body 10 other than the mouth part 11 or the neck part 13, that is, to cover the shoulder part 12, the trunk part 20 and the bottom part 30. With such an inner label member 60, it is possible to add intended letters, images, etc. to the shoulder part 12, the trunk part 20 and the bottom part 30 of the container body 10, give decorativeness to the composite container 10A, make the composite container 10A display information, and so forth.

Incidentally, the inner label member 60 may also be formed on part or all of the surface of the container body 10 other than the mouth part 11. For example, the inner label member 60 may be formed to cover the container body 10 excluding the mouth part 11, that is, to totally cover the neck part 13, the shoulder part 12, the trunk part 20 and the bottom part 30. In addition, the inner label member 60 may either be formed as one member or two or more members. The inner label member 60 may either be formed in the same region as the plastic member 40 or in a region smaller than the plastic member 40. In the latter case, it is desirable that the inner label member 60 be totally covered by the plastic member 40.

The thickness of the inner label member 60 after being attached to the container body 10 can be set at approximately 5 μm to 50 μm, for example, although not limited to this example.

Next, the plastic member 40 will be explained below. As will be explained later, the plastic member 40 (40*a*) is formed by being arranged to surround the outer surface of the inner label member 60*a* and undergoing the biaxially oriented blow molding integrally with the preform 10*a* and the inner label member 60*a*.

The plastic member 40 is attached to the outer surface of the inner label member 60 without using an adhesive, in such close contact that the plastic member 40 does not move or rotate with respect to the container body 10. The plastic member 40 covers the inner label member 60 while being thinly stretched on the outer surface of the inner label member 60. As shown in FIG. 12, the plastic member 40 is arranged in the entire range in regard to the circumferential direction of the container body 10 to surround the container body 10 and to have a substantially circular horizontal section.

The rest of the configuration of the container body 10 and the plastic member 40 is substantially equivalent to that in the above-described first embodiment, and thus detailed explanation thereof is omitted here.

Next, the configuration of the composite preform according to this embodiment will be described below with reference to FIG. 13.

Figure 13:
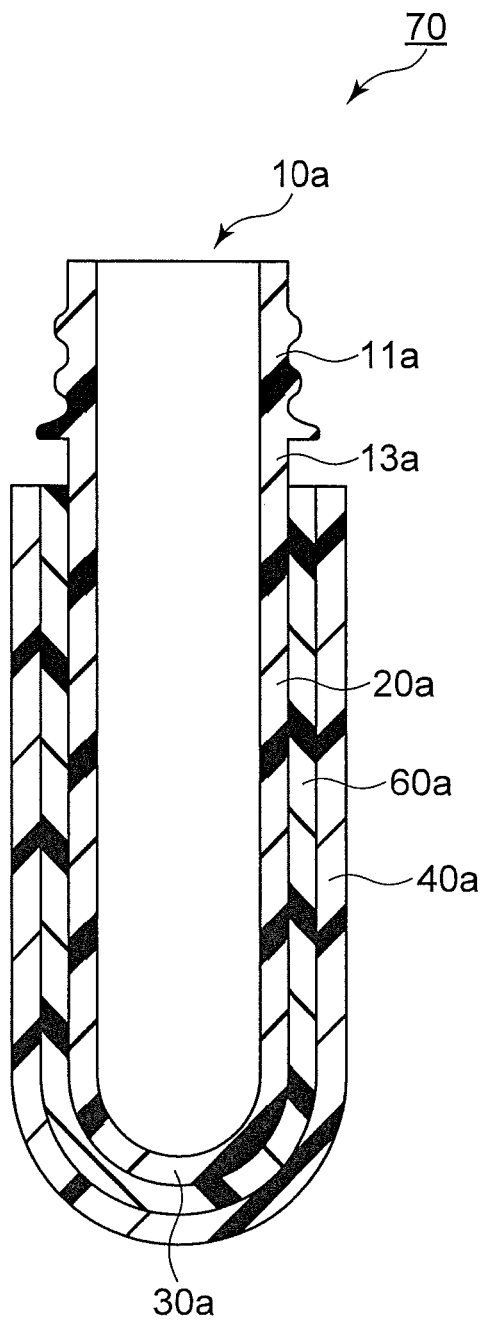
FIG. 13 is a vertical sectional view showing a composite preform according to the second embodiment of the present invention.
Figure 14:
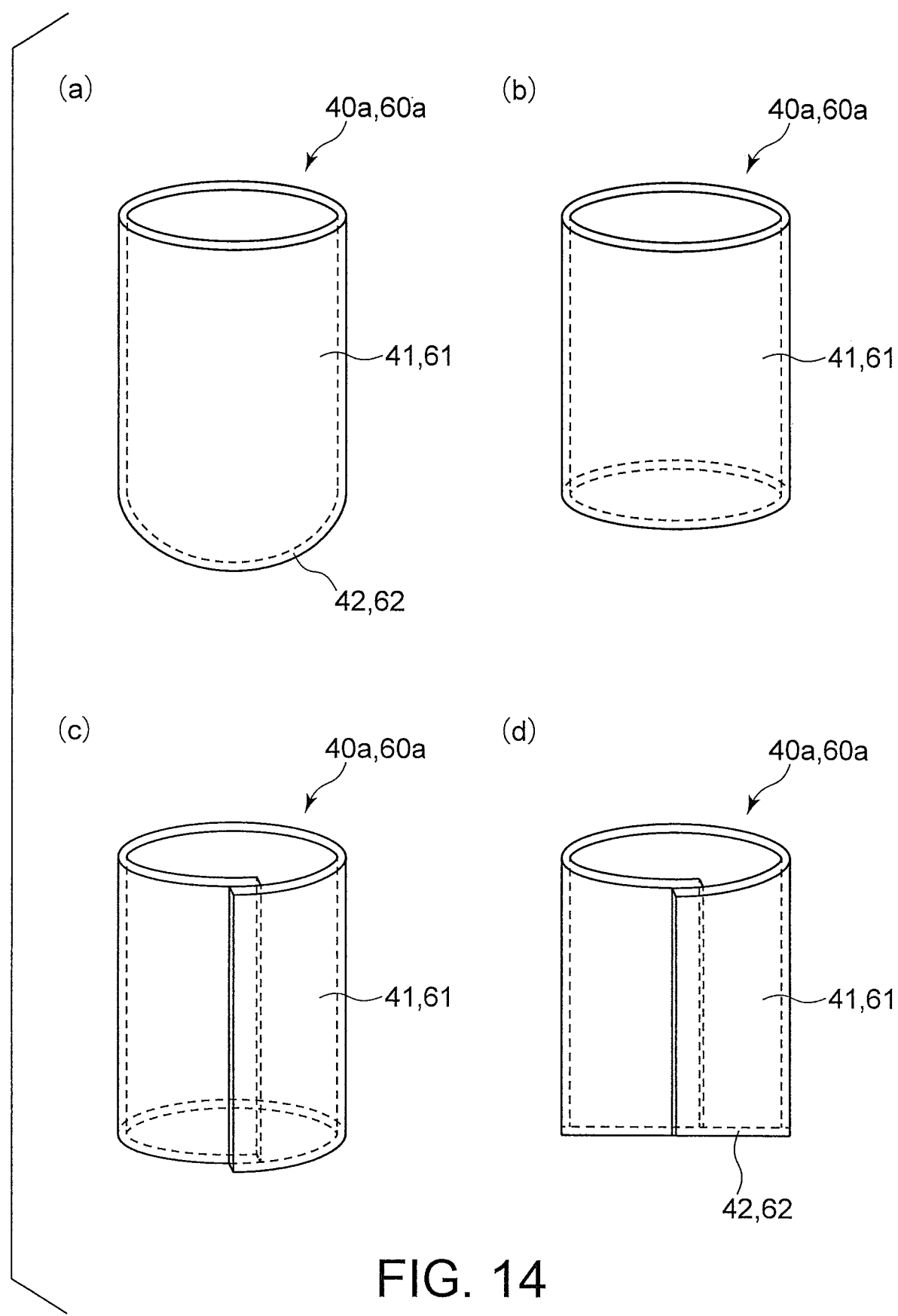
FIGS. 14(a) to 14(d) are perspective views showing various types of inner label members and plastic members.
Figure 15:
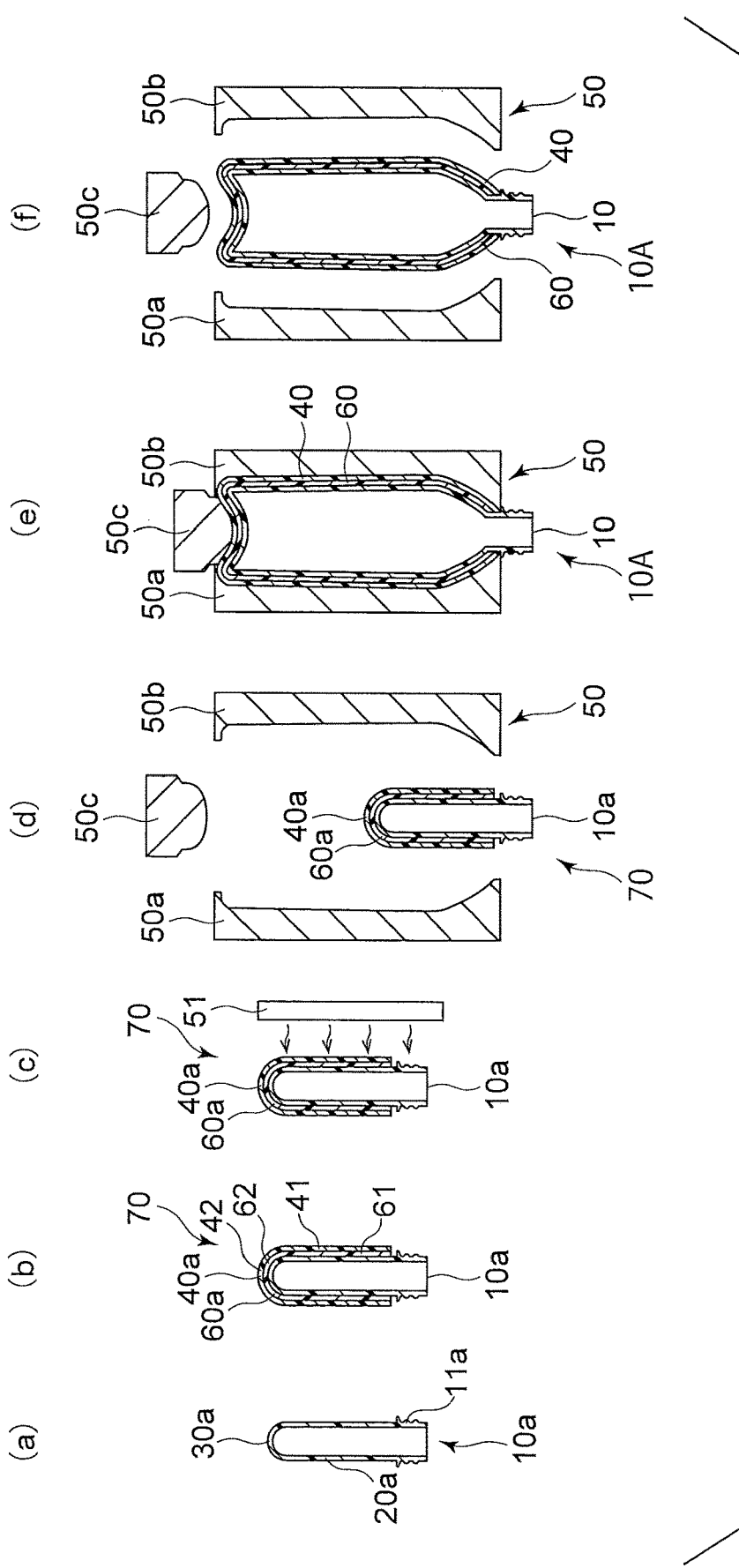
FIGS. 15(a) to 15(f) are schematic diagrams showing a blow molding method according to the second embodiment of the present invention.
Figure 16:
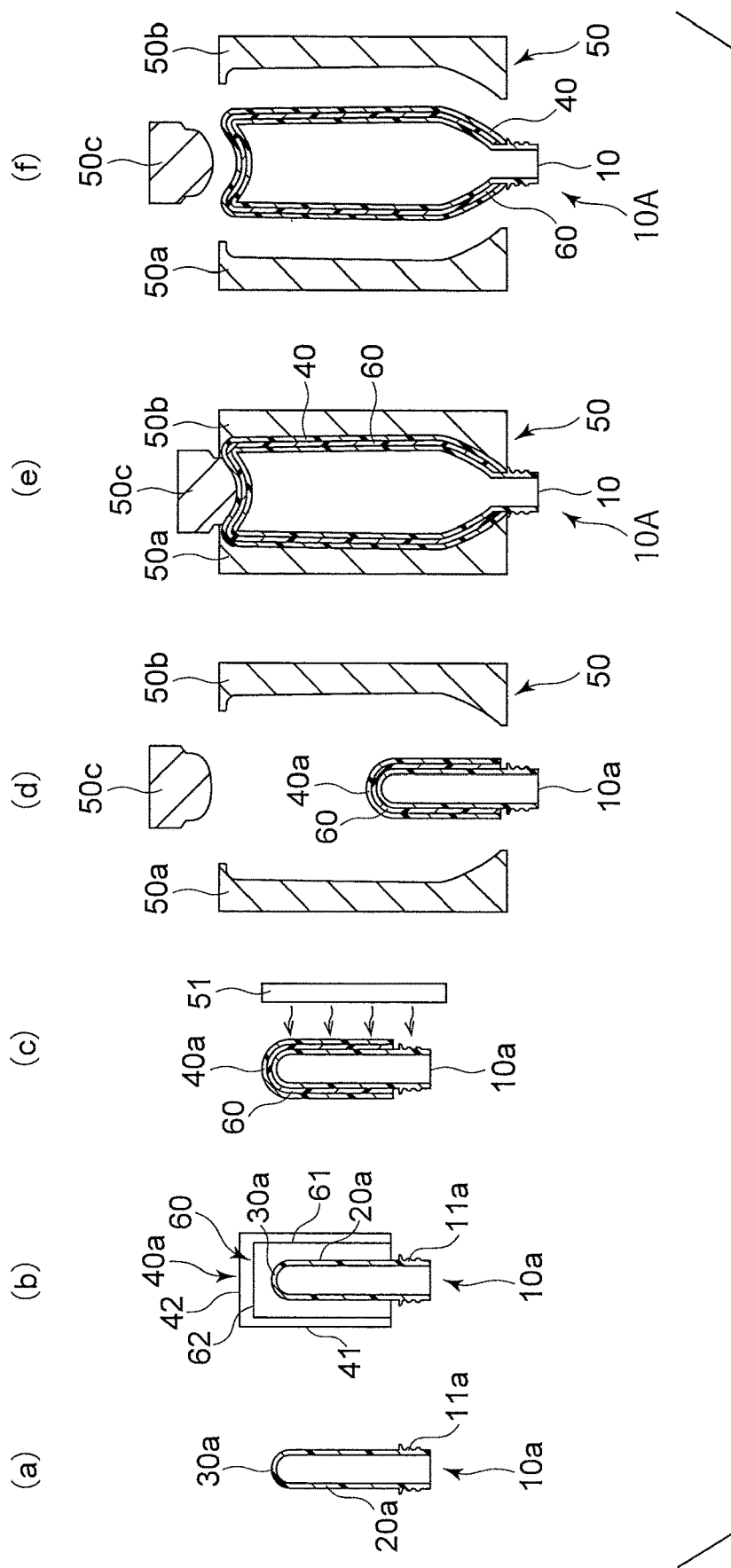
FIGS. 16(a) to 16(f) are schematic diagrams showing a blow molding method according to a modification of the second embodiment of the present invention.
Figure 17:
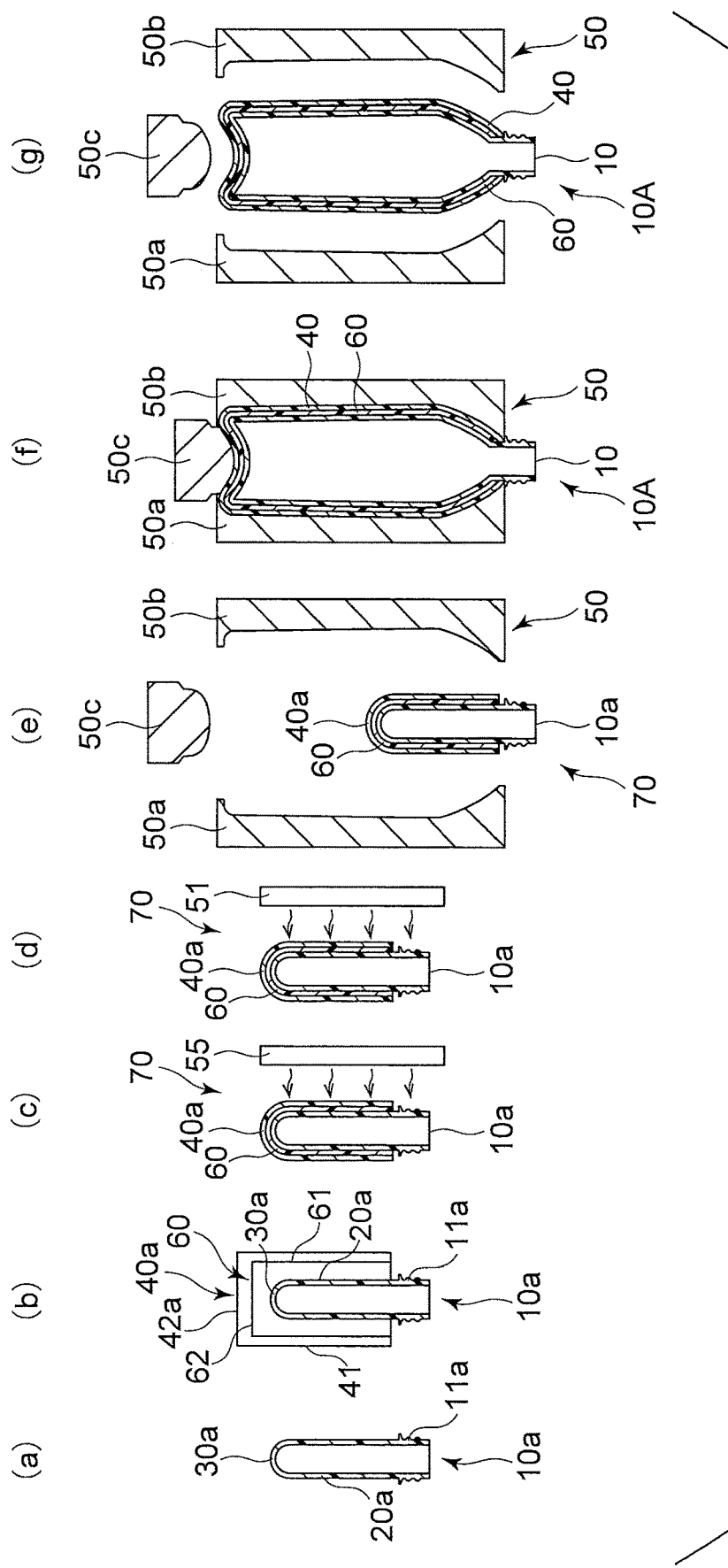
FIGS. 17(a) to 17(g) are schematic diagrams showing a blow molding method according to another modification of the second embodiment of the present invention.

As shown in FIG. 13, the composite preform 70 includes the preform 10*a* made of plastic material, the inner label member 60*a* in a bottomed cylindrical shape arranged in close contact with the outer surface of the preform 10*a*, and the plastic member 40*a* in a bottomed cylindrical shape arranged in close contact with the outer surface of the inner label member 60*a*.

The inner label member 60*a* is set in close contact with the outer surface of the preform 10*a* so that the inner label member 60*a* cannot easily move or rotate with respect to the preform 10*a*. The inner label member 60*a* is arranged in the entire range in regard to the circumferential direction of the preform 10*a* to surround the preform 10*a* and to have a substantially circular horizontal section.

The inner label member 60*a* can previously be provided with a design or printing. For example, textual information such as the names of the liquid in the bottle, the manufacturer, the raw materials, and so forth may be described on the inner label member 60*a* in addition to a design (pattern), the name of the item (merchandise), etc. In this case, it becomes possible to display images and/or letters on the composite container 10A without the need of specially attaching a label or the like to the container body 10 after the blow molding. For example, it is possible to arrange the inner label member 60*a* on part or all of the trunk part 20*a* of the preform 10*a* so that images and/or letters are displayed on the trunk part 20 of the container body 10 after the molding. Accordingly, the process for adding a label to the container by use of a labeler after the container is capped tightly becomes unnecessary. Consequently, the manufacturing cost can be reduced and the manufacturing yield can be prevented from dropping.

A film made of polyester-based resin, polyamide-based resin, polyaramide-based resin, polypropylene-based resin, polycarbonate-based resin, polyacetal-based resin, fluorine-based resin, or the like can be used as such an inner label member 60*a*. The inner label member 60*a* may either be made of a material the same as or different from that of the container body 10 (preform 10*a*) and/or the plastic member 40*a*.

The following various materials may also be used for the inner label member 60*a*:

For example, the inner label member 60*a* may also be made of material having the gas barrier property (oxygen barrier property, water vapor barrier property, etc.). In this case, the gas barrier property of the composite container 10A can be enhanced and the deterioration of the liquid in the bottle by oxygen and water vapor can be prevented without the need of using a multilayer preform, a preform including blended material, or the like as the preform 10*a*. Such material can be PE (polyethylene), PP (polypropylene), MXD-6 (nylon) or EVOH (ethylene vinyl alcohol copolymer), for example. It is also possible to mix an oxygen absorbent (e.g., fatty acid salt) with one or more of these materials.

The inner label member 60*a* may also be made of material having a ray barrier property against ultraviolet rays, etc. In this case, the ray barrier property of the composite container 10A can be enhanced and the deterioration of the liquid in the bottle by ultraviolet rays, etc. can be prevented without the need of using a multilayer preform, a preform including blended material, or the like as the preform 10a. Such material can be blended material or material made by adding light blocking resin to PET, PE or PP.

The inner label member 60a may also be made of material having a higher warm keeping property or cool keeping property (i.e., lower thermal conductivity) than the plastic material forming the container body 10 (preform 10a). In this case, the conduction of the temperature of the liquid in the composite container 10A to the surface of the composite container 10A can be reduced without the need of increasing the thickness of the container body 10 itself. Consequently, the warm keeping property or cool keeping property of the composite container 10A is enhanced. Such material can be foamed polyurethane, polystyrene, PE (polyethylene), PP (polypropylene), phenolic resin, polyvinyl chloride, urea resin, silicone, polyimide, melamine resin, etc.

On the other hand, the plastic member 40a is attached to the outer surface of the inner label member 60a without using an adhesive, in such close contact that the plastic member 40a does not move or rotate with respect to the preform 10a. The plastic member 40a is arranged in the entire range in regard to the circumferential direction of the preform 10a to surround the preform 10a and to have a substantially circular horizontal section.

In this case, the inner label member 60a and the plastic member 40a are formed to cover the most of the trunk part 20a, excluding the part 13a corresponding to the neck part 13 of the container body 10, and to totally cover the bottom part 30a.

Incidentally, the inner label member 60a and the plastic member 40a may also be formed on part or all of the surface of the preform 10a other than the mouth part 11a. For example, the inner label member 60a and the plastic member 40a may be formed to cover the preform 10a excluding the mouth part 11a, that is, to totally cover the trunk part 20a and the bottom part 30a. Each of the inner label member 60a and the plastic member 40a may either be formed as one member or two or more members. For example, two inner label members 60a (two plastic members 40a) may be arranged respectively on different parts of the outer surface of the trunk part 20a.

Such a plastic member 40a may either be a member not having or having the function of contracting with respect to the preform 10a.

In the latter case, materials having the function of contracting with respect to the preform 10a can be used for the plastic member (outer contractive member) 40a. For the plastic member (outer contractive member) 40a, it is desirable to use a member that contracts (e.g., heat shrinkage) with respect to the preform 10a when an external effect (e.g., heat) is exerted thereon.

The rest of the configuration of the preform 10a and the plastic member 40a is substantially equivalent to that in the above-described first embodiment, and thus detailed explanation thereof is omitted here.

Next, the shape of the plastic member 40a and/or the inner label member 60a will be described below.

As shown in FIG. 13 and FIG. 14(a), the plastic member 40a (inner label member 60a) may be formed in a bottomed cylindrical shape as a whole to have a trunk part 41 (trunk part 61) in a cylindrical shape and a bottom part 42 (bottom part 62) connected to the trunk part 41 (trunk part 61). In this case, the bottom part 42 (bottom part 62) of the plastic member 40a (inner label member 60a) covers the bottom part 30a of the preform 10a, and thus various functions and characteristics can be given not only to the trunk part 20 but also to the bottom part 30 of the composite container 10A.

Figure 19:
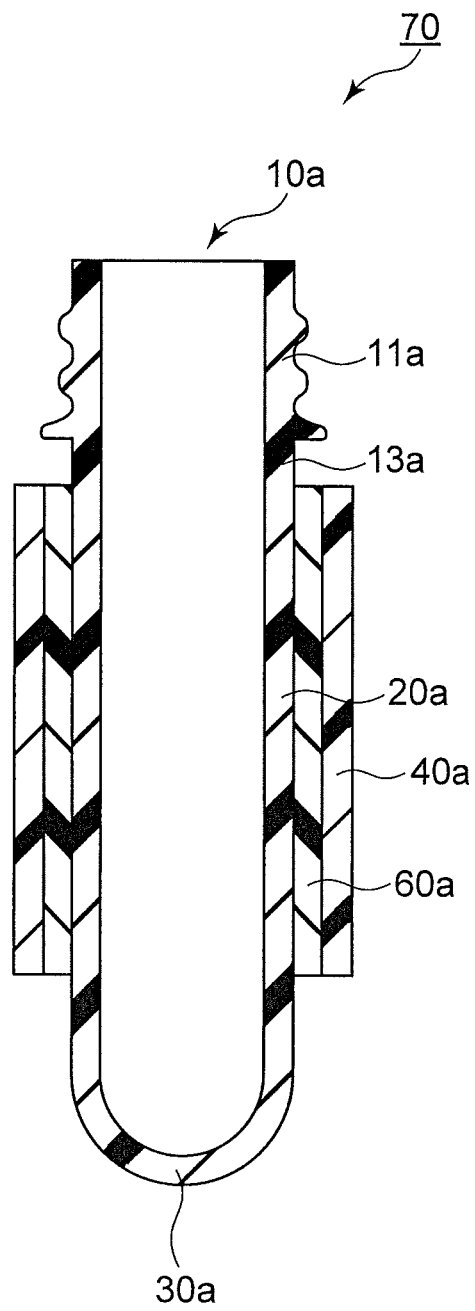
FIG. 19 is a vertical sectional view showing a modification of the composite preform according to the second embodiment of the present invention.
Figure 20:
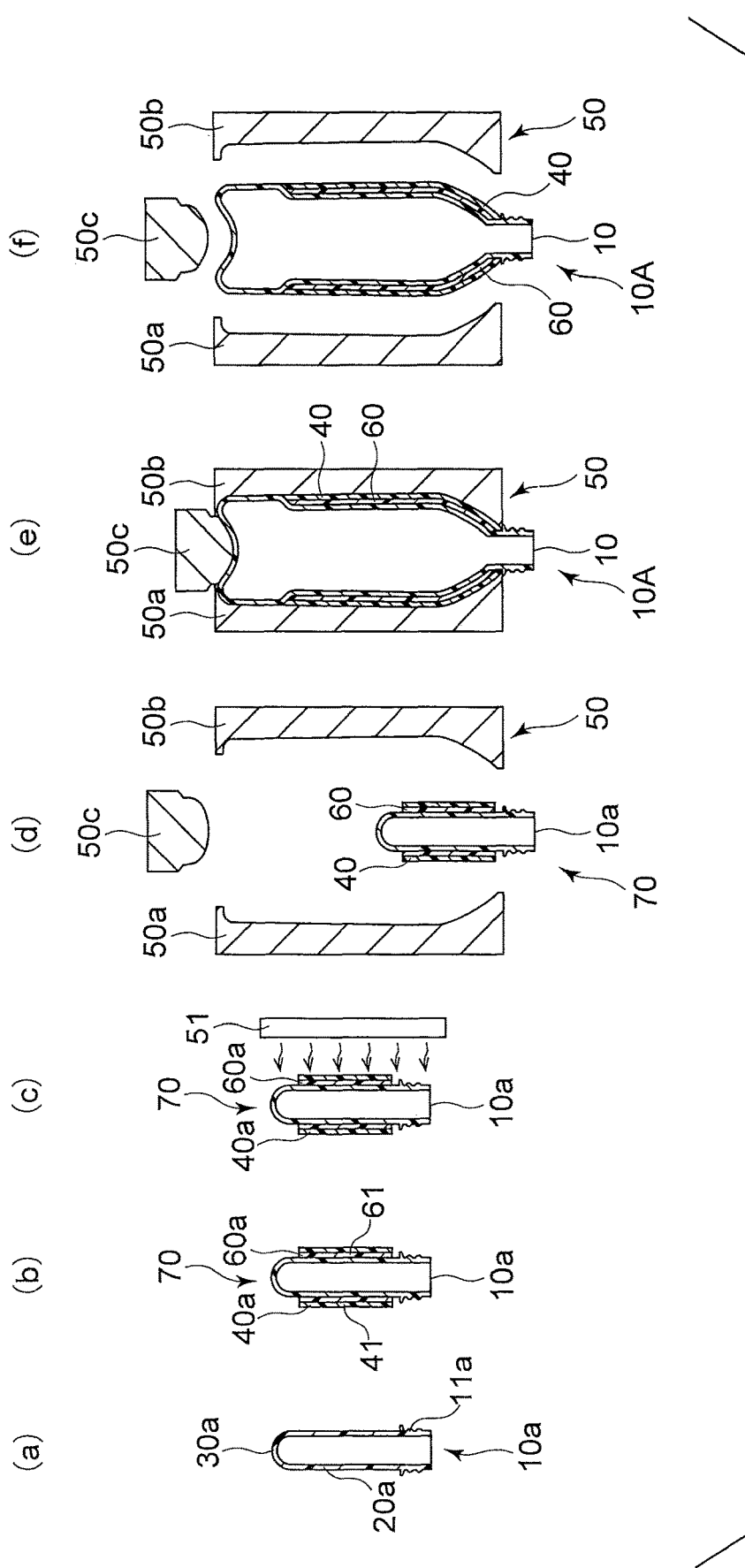
FIGS. 20(a) to 20(f) are schematic diagrams showing a modification of the blow molding method according to the second embodiment of the present invention.

As shown in FIG. 19 (explained later) and FIG. 14(b), the plastic member 40a (inner label member 60a) may also be formed in a circular tube shape (bottomless cylindrical shape) as a whole to have a trunk part 41 (trunk part 61) in a cylindrical shape. In this case, an extruded tube can be used as the plastic member 40a (inner label member 60a), for example.

As shown in FIG. 14(c) and FIG. 14(d), the plastic member 40a (inner label member 60a) may also be made by forming a film into a tubular shape and bonding the film's edges together. In this case, the plastic member 40a (inner label member 60a) may either be formed in a tubular shape (bottomless cylindrical shape) to have a trunk part 41 (trunk part 61) as shown in FIG. 14(c) or formed in a bottomed tubular shape as shown in FIG. 14(d) by forming the bottom part 42 (bottom part 62) through bonding.

Next, the blow molding method (manufacturing method of the composite container 10A) according to this embodiment will be explained below with reference to FIGS. 15(a) to 15(f).

First, the preform 10a made of plastic material is prepared (see FIG. 15(a)).

Subsequently, the inner label member 60a is arranged outside the preform 10a and the plastic member 40a is arranged outside the inner label member 60a, by which the composite preform 70 including the preform 10a, the inner label member 60a in close contact with the outer surface of the preform 10a and the plastic member 40a in close contact with the outer surface of the inner label member 60a is made (see FIG. 15(b)). In this example, the inner label member 60a is in a bottomed cylindrical shape as a whole and includes a trunk part 61 in a cylindrical shape and a bottom part 62 connected to the trunk part 61.

In this case, the inner label member 60a and the plastic member 40a may be set in close contact with the outer surface of the preform 10a by preparing the inner label member 60a and the plastic member 40a as members having inner diameters equal to or slightly smaller than the outer diameter of the preform 10a and pressing and sliding the inner label member 60a and the plastic member 40a onto the preform 10a. Alternatively, the inner label member 60a and the plastic member. 40a may be set in close contact with the outer surface of the preform 10a also by preparing the inner label member 60a and the plastic member 40a as members having heat shrinkability, arranging the inner label member 60a and the plastic member 40a on the outer surface of the preform 10a, and heating the inner label member 60a and the plastic member 40a at 50° C. to 100° C. to cause the heat shrinkage.

It is possible to previously arrange the plastic member 40a around the inner label member 60a and thereafter attach the inner label member 60a and the plastic member 40a integrally to the outer surface of the preform 10a. It is also possible to first arrange the inner label member 60a outside the preform 10a and thereafter arrange the plastic member 40a outside the inner label member 60a.

With this method previously making the composite preform 70 by setting the plastic member 40a in close contact with the outer surface of the inner label member 60a and the preform 10a as above, it becomes possible to carry out the sequence of steps for making the composite preform 70 (FIGS. 15(a) to 15(b)) and the sequence of steps for making the composite container 10A by means of blow molding (FIGS. 15(d) to 15(f)) in different places (e.g., different factories).

Subsequently, the composite preform 70 is heated by a heating device 51 (see FIG. 15(c)).

Subsequently, the composite preform 70 heated by the heating device 51 is fed to a blow molding die 50. The composite container 10A is formed (molded) by using the blow molding die 50. Similarly to the above-described first embodiment, the composite container 10A, including the container body 10, the inner label member 60 arranged on the outer surface of the container body 10 and the plastic member 40 arranged on the outer surface of the inner label member 60, is obtained (see FIGS. 15(d) to 15(f)).

The rest of the blow molding method (manufacturing method of the composite container 10A) according to this embodiment is substantially equivalent to that in the above-described first embodiment, and thus detailed explanation thereof is omitted here.

Modification of Blow Molding Method

Next, a modification of the blow molding method (manufacturing method of the composite container 10A) according to this embodiment will be described below with reference to FIGS. 16(a) to 16(f). In the modification shown in FIGS. 16(a) to 16(f), the plastic member (outer contractive member) 40a is a member having the function of contracting with respect to the preform 10a. The rest of the configuration is substantially equivalent to that in the example shown in FIGS. 15(a) to 15(f). Elements in FIGS. 16(a) to 16(f) identical with those in FIGS. 15(a) to 15(f) are assigned the same reference characters as in FIGS. 15(a) to 15(f) and detailed explanation thereof is omitted for brevity.

First, the preform 10a made of plastic material is prepared (see FIG. 16(a)).

Subsequently, the inner label member 60 is arranged outside the preform 10a, and the plastic member (outer contractive member) 40a is arranged outside the inner label member 60 (see FIG. 16(b)). The inner label member 60 and the plastic member (outer contractive member) 40a are attached so as to cover the most of the trunk part 20a, excluding the part corresponding to the neck part 13 of the container body 10, and to totally cover the bottom part 30a. It is also possible to form the plastic member (outer contractive member) 40a so that at least part of it is transparent or semitransparent.

In this case, it is possible to previously arrange the plastic member (outer contractive member) 40a around the inner label member 60 and thereafter attach the inner label member 60 and the plastic member (outer contractive member) 40a integrally to the outer surface of the preform 10a. It is also possible to first arrange the inner label member 60 outside the preform 10a and thereafter arrange the plastic member (outer contractive member) 40a outside the inner label member 60.

Subsequently, the preform 10a, the inner label member 60 and the plastic member (outer contractive member) 40a are heated by a heating device 51 (see FIG. 16(c)). In this step, the preform 10a, the inner label member 60 and the plastic member (outer contractive member) 40a, being rotated with the mouth part 11a facing downward, are heated by the heating device 51 evenly in regard to the circumferential direction. The heating temperature of the preform 10a, the inner label member 60 and the plastic member (outer contractive member) 40a in this heating process may be set at 90° C. to 130° C., for example.

The plastic member (outer contractive member) 40a heated as above contracts (heat shrinkage) and is set in close contact with the outer surface of the preform 10a (see FIG. 16(c)). In cases where the plastic member (outer contractive member) 40a itself has contractility, the plastic member (outer contractive member) 40a may already be in close contact with the outer surface of the inner label member 60 at the stage when the plastic member (outer contractive member) 40a is arranged outside the inner label member 60 (see FIG. 16(b)).

Subsequently, the preform 10a, the inner label member 60 and the plastic member (outer contractive member) 40a heated by the heating device 51 are fed to a blow molding die 50 (see FIG. 16(d)).

The preform 10a, the inner label member 60 and the plastic member (outer contractive member) 40a are formed (molded) by using the blow molding die 50. Similarly to the above-described example of FIGS. 15(a) to 15(f), the composite container 10A, including the container body 10, the inner label member 60 arranged on the outer surface of the container body 10 and the plastic member (outer contractive member) 40 arranged on the outer surface of the inner label member 60, is obtained (see FIGS. 16(d) to 16(f)).

Next, another modification of the blow molding method (manufacturing method of the composite container 10A) according to this embodiment will be described below with reference to FIGS. 17(a) to 17(g). In the modification shown in FIGS. 17(a) to 17(g), the plastic member (outer contractive member) 40a is a member having the function of contracting with respect to the preform 10a, and the preform 10a and the plastic member (outer contractive member) 40a are heated in two steps. The rest of the configuration is substantially equivalent to that in the example shown in FIGS. 15(a) to 15(f). Elements in FIGS. 17(a) to 17(g) identical with those in FIGS. 15(a) to 15(f) are assigned the same reference characters as in FIGS. 15(a) to 15(f) and detailed explanation thereof is omitted for brevity.

First, the preform 10a made of plastic material is prepared (see FIG. 17(a)).

Subsequently, the inner label member 60 is arranged outside the preform 10a, and the plastic member (outer contractive member) 40a is arranged outside the inner label member 60 (see FIG. 17(b)). The plastic member (outer contractive member) 40a is attached so as to cover the most of the trunk part 20a, excluding the part corresponding to the neck part 13 of the container body 10, and to totally cover the bottom part 30a. It is also possible to form the plastic member (outer contractive member) 40a so that at least part of it is transparent or semitransparent.

In this case, it is possible to previously arrange the plastic member (outer contractive member) 40a around the inner label member 60 and thereafter attach the inner label member 60 and the plastic member (outer contractive member) 40a integrally to the outer surface of the preform 10a. Alternatively, it is also possible to first arrange the inner label member 60 outside the preform 10a and thereafter arrange the plastic member (outer contractive member) 40a outside the inner label member 60.

Subsequently, the preform 10a, the inner label member 60 and the plastic member (outer contractive member) 40a are heated by a first heating device 55 (see FIG. 17(c)). In this step, the heating temperature of the preform 10a, the inner label member 60 and the plastic member (outer contractive member) 40a may be set at 50° C. to 100° C., for example.

The heated plastic member (outer contractive member) 40a contracts (heat shrinkage) and is set in close contact with the outer surface of the preform 10a, by which the composite preform 70, including the preform 10a, the inner label member 60 in close contact with the outer surface of the preform 10a and the plastic member (outer contractive member) 40a in close contact with the outer surface of the inner label member 60, is obtained (see FIG. 17(c)).

With this method previously making the composite preform 70 by heating the plastic member (outer contractive member) 40a by use of the first heating device 55 and setting the plastic member 40a in close contact with the outer surface of the inner label member 60 and the preform 10a as above, it becomes possible to carry out the sequence of steps for making the composite preform 70 (FIGS. 17(a) to 17(c)) and the sequence of steps for making the composite container 10A by means of blow molding (FIGS. 17(d) to 17(g)) in different places (e.g., different factories).

Subsequently, the composite preform 70 is heated by a second heating device 51 (see FIG. 17(d)). In this step, the composite preform 70, being rotated with the mouth part 11a facing downward, is heated by the second heating device 51 evenly in regard to the circumferential direction. The heating temperature of the preform 10a, the inner label member 60 and the plastic member (outer contractive member) 40a in this heating process may be set at 90° C. to 130° C., for example.

Subsequently, the composite preform 70 heated by the second heating device 51 is fed to a blow molding die 50 (see FIG. 17(e)).

The composite preform 70 is formed (molded) by using the blow molding die 50. Similarly to the above-described example of FIGS. 15(a) to 15(f), the composite container 10A, including the container body 10, the inner label member 60 arranged on the outer surface of the container body 10 and the plastic member (outer contractive member) 40 arranged on the outer surface of the inner label member 60, is obtained (see FIGS. 17(e) to 17(g)).

As described above, according to this embodiment, the composite container 10A including the container body 10, the inner label member 60 and the plastic member 40 is made by integrally inflating the preform 10a, the inner label member 60a and the plastic member 40a of the composite preform 70 through the blow molding of the composite preform 70 in the blow molding die 50. Accordingly, the composite container 10A can be provided with the inner label member 60 at the stage when the composite container 10A is made by using the preform 10a. Therefore, the process for adding a label to the container by use of a labeler after the composite container 10A is filled with the liquid and capped tightly is unnecessary. Consequently, the manufacturing cost for the manufacture of the end products can be reduced.

Further, the manufacturing yield in the manufacture of the end products can be prevented from being dropped by malfunction of the labeler or the like.

Furthermore, according to this embodiment, the preform 10a (container body 10) and the plastic member 40a (plastic member 40) can be formed of different members (materials). Therefore, various functions and characteristics can be given to the composite container 10A in a flexible manner by properly selecting the type and shape of the plastic member 40.

Moreover, according to this embodiment, there arises no need for preparing new molding equipment for the manufacture of the composite containers 10A since a standard type of blow molding apparatus can directly be used for the manufacture of the composite containers 10A.

Modification

Next, a modification according to the present invention will be described below with reference to FIGS. 18, 19 and 20(a) to 20(f).

In the modification shown in FIGS. 18, 19 and 20(a) to 20(f), an inner label member 60a and a plastic member 40a in cylindrical shapes are used instead of the inner label member 60a and the plastic member 40a each having the trunk part and the bottom part.

Figure 18:
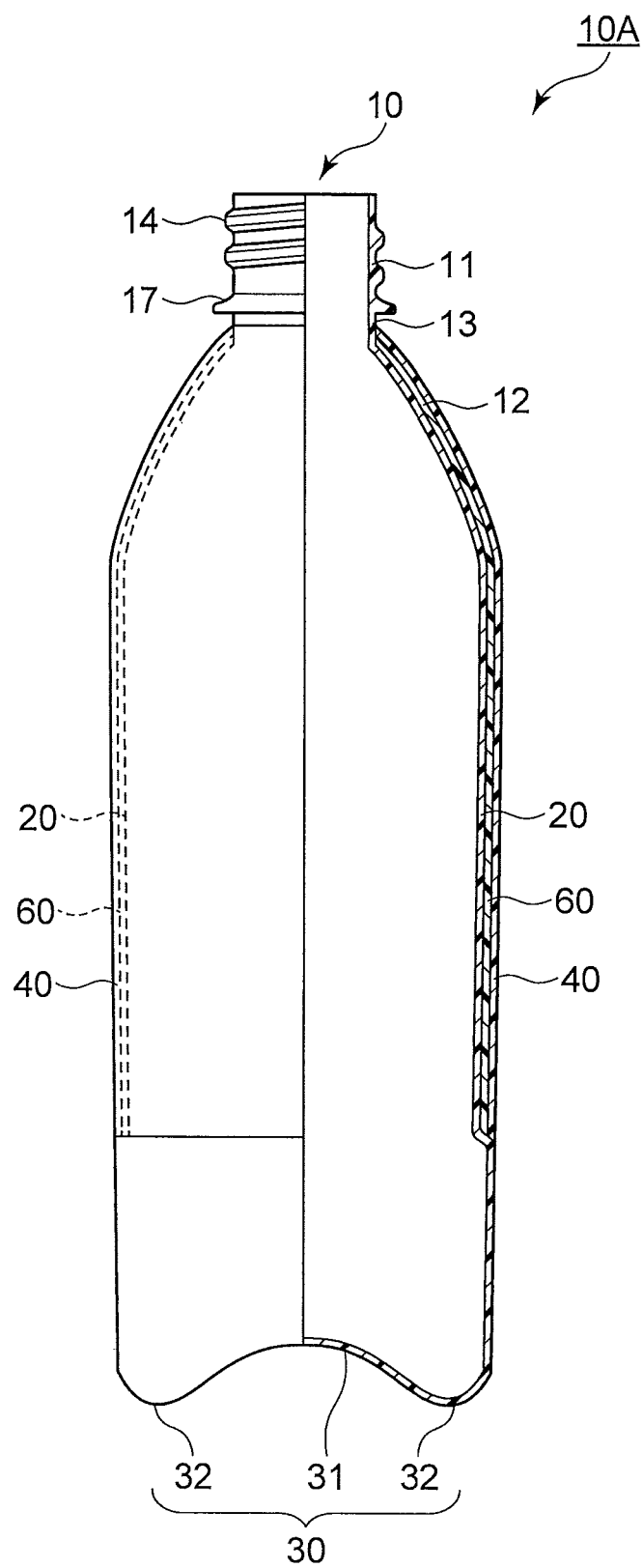
FIG. 18 is a partial vertical sectional view showing a modification of the composite container according to the second embodiment of the present invention.

In the composite container 10A shown in FIG. 18, the inner label member 60 and the plastic member 40 extend from the shoulder part 12 of the container body 10 to a lower part of the trunk part 20 but do not reach the bottom part 30. Further, in the composite preform 70 shown in FIG. 19, the inner label member 60a and the plastic member 40a are set in close contact with the preform 10a to cover only the trunk part 20a of the preform 10a. More specifically, the inner label member 60a and the plastic member 40a cover the trunk part 20a excluding its lower part and the part 13a corresponding to the neck part 13 of the container body 10.

The rest of the configuration in FIGS. 18, 19 and 20(a) to 20(f) is substantially equivalent to that in the embodiment shown in FIGS. 11 to 15. In the modification shown in FIGS. 18, 19 and 20(a) to 20(f), elements identical with those in the embodiment shown in FIGS. 11 to 15 are assigned the same reference characters as in the embodiment and detailed explanation thereof is omitted for brevity.

Besides, the rest of the configuration and the manufacturing method of the composite container 10A and the rest of the configuration and the manufacturing method of the composite preform 70 are substantially equivalent to those in the embodiment shown in FIGS. 11 to 15, and thus detailed explanation thereof is omitted here. It is also possible in FIGS. 18, 19 and 20(a) to 20(f) to use a member having the function of contracting with respect to the preform 10a as the plastic member 40a.

The invention claimed is:

1. A composite container without an attached label comprising:
    a container body which is made of plastic material and includes:
        a mouth part;
        a neck part;
        a shoulder part;
        a trunk part; and
        a bottom part having a concave part situated at a center of the bottom part; and
        a grounding part formed around the concave part, wherein:
        the mouth part includes a screw part and a flange part,
        the neck part has a cylindrical shape and situated between the flange part and the shoulder part,
        the shoulder part is shaped such that a diameter of the shoulder part gradually increases from a side of the neck part towards a side of the trunk part and situated between the neck part and the trunk part,
    a plastic member and an inner label member which are arranged in close contact with an outer surface of the container body without bonding to the container body, the plastic member being made of a heat shrinkable material; and
    the inner label member being arranged between the outer surface of the container body and the plastic member, wherein:
        the container body, the plastic member and the inner label member have been integrally inflated by means of blow molding;
        the plastic member being configured to include a design or a print before being inflated;
        the plastic member does not have a bonding part;

the inner label member is arranged in direct contact with the concave part of the container body and the grounding part of the bottom part of the container body so as to follow a shape of the concave part of the container body and the grounding part of the container body;

the plastic member is arranged in direct contact with an entire outer surface of the inner label member;

the plastic member and the inner label member are arranged so as not to cover the neck part and to cover an entire portion of the shoulder part.

2. The composite container according to claim 1, wherein: the plastic member is arranged to cover the trunk part and the bottom part of the container body.

3. The composite container according to claim 1, wherein the plastic member has a gas barrier property or a ray barrier property.

4. The composite container according to claim 1, wherein the plastic member is made of material having a higher warm keeping property or cool keeping property than the plastic material forming the container body.

5. The composite container according to claim 1, wherein the plastic member is made of material that is less slippery than the plastic material forming the container body.

6. The composite container according to claim 1, wherein the plastic member is an outer contractive member having a function of contracting.

7. The composite container according to claim 1, wherein a thickness of the plastic member is between 5 μm and 50 μm.

8. The composite container according to claim 1, wherein the plastic member is arranged to cover an entire trunk portion of the container body.

* * * * *